(12) United States Patent
Harris et al.

(10) Patent No.: US 7,392,229 B2
(45) Date of Patent: Jun. 24, 2008

(54) GENERAL PURPOSE SET THEORETIC PROCESSOR

(75) Inventors: Curtis L. Harris, 209 Dartmouth Dr., SE., Albuquerque, NM (US) 87106; Jack Ring, Gilbert, AZ (US)

(73) Assignee: Curtis L. Harris, Albuquerque, NM (US)

( * ) Notice: Subject to any disclaimer, the term of this patent is extended or adjusted under 35 U.S.C. 154(b) by 156 days.

(21) Appl. No.: 11/353,318

(22) Filed: Feb. 13, 2006

(65) Prior Publication Data

US 2007/0147568 A1 Jun. 28, 2007

Related U.S. Application Data

(60) Provisional application No. 60/652,738, filed on Feb. 12, 2005.

(51) Int. Cl.
*G06F 15/18* (2006.01)
(52) U.S. Cl. .......................................... 706/12
(58) Field of Classification Search ..................... 706/12
See application file for complete search history.

(56) References Cited

U.S. PATENT DOCUMENTS

| | | | |
|---|---|---|---|
| 3,358,270 A | 12/1967 | Crew et al. | |
| 4,094,001 A | 6/1978 | Miller | |
| 4,451,901 A | 5/1984 | Wolfe et al. | |
| 4,531,201 A | 7/1985 | Skinner, Jr. | |
| 4,625,295 A | 11/1986 | Skinner | |
| 4,747,072 A | 5/1988 | Robinson et al. | |
| 4,760,523 A | 7/1988 | Yu et al. | |
| 5,051,947 A | 9/1991 | Messenger et al. | |
| 2002/0032670 A1 | 3/2002 | Watanabe et al. | |
| 2002/0059152 A1 | 5/2002 | Carson et al. | |
| 2002/0125500 A1 | 9/2002 | Mattausch et al. | |
| 2002/0168100 A1 | 11/2002 | Woodall | |
| 2003/0014240 A1 | 1/2003 | Navoni et al. | |
| 2003/0055799 A1 | 3/2003 | Starzyk | |
| 2003/0194124 A1 | 10/2003 | Suzuki et al. | |
| 2003/0229636 A1 | 12/2003 | Mattausch | |
| 2004/0080973 A1 | 4/2004 | Ogura | |
| 2004/0123071 A1 | 6/2004 | Stefan et al. | |
| 2004/0156546 A1 | 8/2004 | Kloth | |
| 2004/0250013 A1 | 12/2004 | Ogura | |

(Continued)

OTHER PUBLICATIONS

Genov, Roman, et al., "Kerneltron: Support Vector "Machine" in Silicon", *IEEE Transactions on Neural Networks*, vol. 14, No. 5,(Sep. 2003), 1426-1433.

(Continued)

*Primary Examiner*—David R Vincent
*Assistant Examiner*—Ben M Rifkin
(74) *Attorney, Agent, or Firm*—Townsend and Townsend and Crew LLP; Kenneth R. Allen

(57) ABSTRACT

A general purpose processor architecture (methods and apparatuses) that can discern all subsets of a serial data stream which fulfill an arbitrarily complex reference pattern. The invention comprises an ordered set of Detection Cells conditionally interconnected according to the reference pattern and operationally controlling one another's states through the network. The invention preferably includes a Host Interface to enable reporting of Results from a search session as well as the input and control of reference patterns and source data.

18 Claims, 21 Drawing Sheets

General Purpose
Set Theoretic Processor (GPSTP)
Components

U.S. PATENT DOCUMENTS

2005/0049984 A1    3/2005   King
2005/0154802 A1    7/2005   Kravec et al.
2005/0257025 A1    11/2005  Spencer

OTHER PUBLICATIONS

Genov, Roman, et al., "Silicon Support Vector Machine with On-Line Learning", *International Journal of Pattern Recognition*, vol. 17, No. 3, World Scientific Publishing Company,(2003),385-404.

Hasan, S.M. R., et al., "A VLSI BAM Neural Network Chip for Pattern Recognition Applications", *1995 IEEE International Conference on Neural Networks Proceedings*, IEEE, Part vol. 1, New York, NY, (1995), 164-168.

Kurogi, Shuichi, et al., "Multilayered and Columnar Competitive Networks for Spoken Word Recognition", *Proceedings of the 9th International Conference on Neural Information Processing (ICONIP'02)*, vol. 5, Wang, Lipo, et al., Editors,(2002),2223-2227.

Matshubishi, Noritsugu, et al., "A Vector Digitao Signal Processor LSI for Speaker-Independent Voice Pattern Matching", *IEEE 1991 Custom Integrated Circuits Conference*, (1991), 16.4.1-14.4.4.

Ogawa, Makoto, et al., "A General-Purpose Vector-Quantization Processor Employing Two-Dimensional Bit-Propagating Winner-Take-All", *2002 Symposium On VLSI Circuits, Digest of Technical Papers*, IEEE, Piscataway, N.J., (2002),244-247.

Stormon, Charles D., "The Coherent Processor TM An Associative Processor Architecture and Applications", *COMPCON Spring '91, Digest of Papers*, IEEE Cput. Soc. Press, Los Alamitos, CA., (1991),270-275.

Tsai, Horng-Ren, et al., "Optimal Speed-Up Parallel Image Template Matching Algorithms on Processor Arrays with a Reconfigurable Bus System", *Computer Vision and Image Understanding*, vol. 71, No. 3,(1998),393-412.

Yamashita, Nobuyuki, et al., "An Integrated Memory Array Processor with a Synchronous-DRAM Interface for Real-Time Vision Applications", *Proceedings of the 13th International Conference on Pattern Recognition*, IEEE Comput. Soc. Press, Part vol. 4, Los Alamitos, CA.,(1996),575-580.

Representative Operational Configuration

*General Purpose
Set Theoretic Processor (GPSTP)
Components*

**GPSTP Conventional Memory Structure
Pattern Load and Diagnostic Read**

**GPSTP Alternative Memory Structure
Pattern Perception Execution**

Recognition Network Components

| Address | Output | Write | Read |
|---------|--------|-------|------|
| L | 0 | 1 | 0 |

| | | |
|---|---|---|
| • | • | • |
| • | • | • |
| • | • | • |
| 65 | 0 | A |
| 66 | 0 | B |
| 67 | 0 | C |
| 68 | 0 | D |
| 69 | 0 | E |
| 70 | 0 | F |
| 71 | 0 | G |
| 72 | 0 | H |
| 73 | 0 | I |
| 74 | 0 | J |
| 75 | 0 | K |
| 76 | 1 | L |
| 77 | 0 | M |
| 78 | 0 | N |
| 79 | 0 | O |
| 80 | 0 | P |
| • | • | • |
| • | • | • |
| • | • | • |

Write
Fig 6A

| Address | Output | Write | Read |
|---------|--------|-------|------|
| L | 1 | 0 | 1 |

| | | |
|---|---|---|
| • | • | • |
| • | • | • |
| • | • | • |
| 65 | 0 | A |
| 66 | 0 | B |
| 67 | 0 | C |
| 68 | 0 | D |
| 69 | 0 | E |
| 70 | 0 | F |
| 71 | 0 | G |
| 72 | 0 | H |
| 73 | 0 | I |
| 74 | 0 | J |
| 75 | 0 | K |
| 76 | 1 | L |
| 77 | 0 | M |
| 78 | 0 | N |
| 79 | 0 | O |
| 80 | 0 | P |
| • | • | • |
| • | • | • |
| • | • | • |

Read
Fig 6B

Counter Representation Method (ASCII)

Fig. 6

Detection Propagation Method

*Detection Cell Formulaic Description*

*State-Change Routing Matrix, Complex Term Method*

*State-Change Routing Cell Formulaic Description*

Neighbor (Immediate Successor) Enable Method

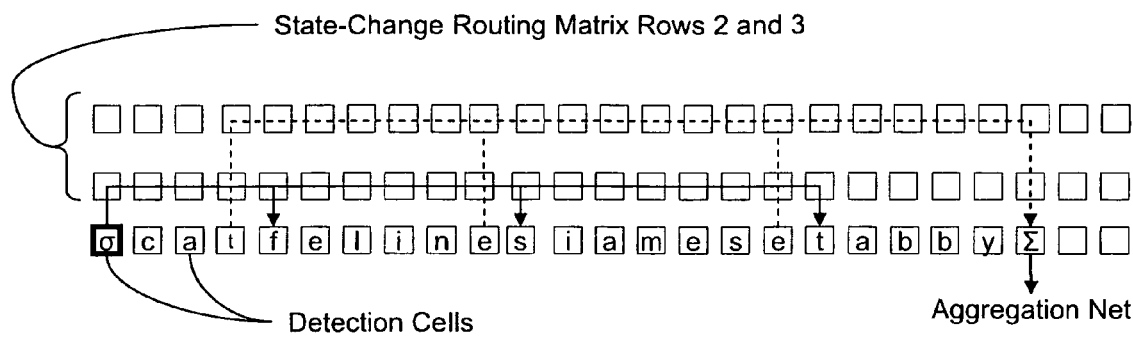
*Fig. 12 A*
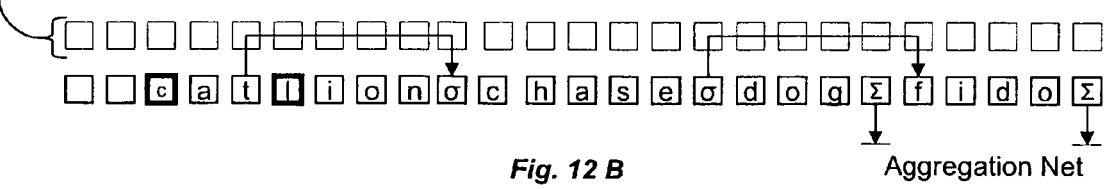
*Fig. 12 B*
σ = one or more inter-word characters
Σ = any inter-word or punctuation character
*Examples of State-Change Routing Matrix Methods*
*Fig. 12*

*"Bridge" a Flawed Detection Column Method*

Aggregation Routing Matrix

Aggregation Routing Cell Formulaic Description

*Threshold Logic*

Detection Cell Detail

State-Change Routing Cell Detail

Aggregation Routing Cell Detail

Group Threshold Logic Detail

GENERAL PURPOSE SET THEORETIC PROCESSOR

CROSS-REFERENCE TO RELATED APPLICATIONS

This application claims priority to and the benefit of the filing of U.S. Provisional Patent Application Ser. No. 60/652,738, filed on Feb. 12, 2005, and the specification and any provisional claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to the field of digital electronic devices for recognizing specified patterns in a data stream, specifically claimed is a general purpose architecture and device for set theoretic processing.

2. Description of Related Art

In the pattern recognition field, whether in searching textual data or other form of source data, four problems persist; acuity, throughput, scalability and cost. Accordingly, these are the measures of effectiveness for any new technology in this field.

Acuity is measured as the sum of False Positives and False Negatives in the results of a scan. False positives occur when the scan results in irrelevant patterns. False Negatives occur when the scan fails to identify patterns that are, in fact, relevant. The ideal pattern recognition device will not make such errors. The next best device will enable a user to control the amount of error as well as the ratio of False Positives to False Negatives.

As to scalability, pattern matching involves identifying symbols and syntax identical to the user's expression of interest. Pattern recognition goes further by enabling the specification of a class of equivalent terms and by aggregating all qualifying instances. This distinction became important as search technology progressed from text search to imagery search to detection of malware for cybersecurity and for detection of evolving patterns in biocomplexity informatics. Accordingly, minimizing False Positives and False Negatives may entail reference patterns that specify upwards of 100 terms each averaging 10 features. The vaunted Google search engine experienced an average query of 2.3 terms, circa 2004. Modern recognition devices should have the capacity to compare upwards of 1000 features to the source data stream and be scalable to 1 million features. Other dimensions of scalability include implementation of a personal-scale device to a federated system of millions of devices throughout the World Wide Web.

Throughput is the speed at which the source data is examined and results reported. The typical measure of throughput is characters per second. Constant or at least predictable throughput is best, not dependent on the complexity of the reference pattern nor the number of recognitions per unit time.

Cost is the total cost of ownership of a search episode regardless of how the costs are allocated. For example, a user pays nothing for a Google search episode but somebody is paying for the MIPS (millions of instructions per second), bytes and baud that are used to accomplish the search. Cost includes the preprocessing of source data as well as the actual search episode.

Starting approximately in the mid-1900's, various strategies have sought to improve performance in one or more of the measures by leveraging technologies and innovating architectures. The state of the art is still far from realizing, simultaneously, specifiable acuity, throughput at the speed of silicon, scale from single user to federated users and cost levels that small and medium enterprises and even individuals can afford.

The following paragraphs summarize the field to date.

The general purpose computer, designed to perform arithmetic, has been used since the 1950's for comparison of digital data in the form of characters, character strings and combinations of character strings. A straightforward program can utilize the memory and CPU (central processing unit) to input a reference character then compare it, sequentially, to multiple characters of various kinds as presented by a source data stream. The presence in the source data stream of a matching character can be flagged for subsequent reference. More than one such character may be found and flagged and more than one instance of any specific character may be found and flagged. Each such operation consumes several clock cycles of a modern microprocessor.

If the reference is a string consisting of multiple characters in a specific sequence, i.e., representing a word of text, or a music melody or a genomic pattern, then a more complicated program is required. Character-level comparison proceeds as before then the interim results are stored for subsequent processing to determine whether the characters that qualified are in the sequence required for a word-level match. This is known as the combinatorial explosion problem because the number of machine cycles increases as the square of the number of conditional matches. Such operations typically consume thousands of clock cycles and there is no upper limit.

If the reference consists of a phrase, e.g., a string of words in a specific order, then the program, using recursion, is only somewhat more complicated but the combinatorial explosion can become even more dramatic and can consume billions of clock cycles. Although grid configurations of megaflop processors can supply the clock cycles the expense of the device quickly becomes prohibitive and throughput can be in the range of only a few characters per second.

The dismal acuity exhibited by pattern matching machines to date stems from attempts to avoid the combinatorial explosion problem. Most text applications use key words to surrogate the source data. Then searches compare the reference pattern to only the key word file, not to the actual text. This approach invokes the well known problem of retrieving citations that are irrelevant (false positives) thus incurring waste and cost. A not so well known but worse outcome is that truly relevant patterns in the data being scanned are not recognized (false negatives) because the content was not represented with sufficient fidelity by the key words used.

Attempts to extract meanings from text are frustrated by the complexity of the problem but more so by the indexing to terms as noted in the previous paragraph. Implementations of pattern recognition have been demonstrated with pre-processing and post-processing software, such as statistical clustering and Latent Semantic Indexing. In essence these seek to overcome the limitations inherent in indexed or censored text streams by further processing of the term matches found by the hardware. This approach to recovery of meanings in the censored text can never overcome the limitations imposed by the censoring in the first place.

United States Patent Publication 2005/0154802, Parallel pattern detection engine. Multiple processing units (PUs) customized to do various modes of pattern recognition. Each pattern has an Opcode. PUs may be cascaded to enable longer patterns to be matched or to allow more patterns to be processed in parallel for a particular input data stream. Cost and throughput are highly suspect. Also, the application appears to implement nesting but not equivalence classes.

SIMM, SIMD and similar hardware CPU embellishments have been invented for data flow applications. These have demonstrated speed improvements in the single digit range but also increased cost.

United States Patent Publication 2005/0257025, State engine for data processor. Uses parallel processors, such as SIMD array processors. Claims that a read/modify/write operation can be performed in only two cycles and a complete command in only three to five cycles. These performances appear to be for fundamental pattern matching but not for partial matches and consideration of variants such as plurals.

Supercomputer configurations and more recently grid configurations of microprocessors have been programmed for set theoretic processing both for Very Large Data Base situations and genomic research. Cost inhibits most potential users from this option.

In the limit, the basic Von Neuman stored program computer simply cannot exhibit the speed/cost ratios available with other implementations.

The special purpose processor category contains many examples of prior art. Early examples include the General Electric series;

U.S. Pat. No. 3,358,270, December 1967.

U.S. Pat. No. 4,094,001, Digital logic circuits for comparing ordered character strings of variable length, Jun. 6, 1978.

U.S. Pat. No. 4,451,901. High speed search system. May 29, 1984.

Also in this category are the TRW series;

U.S. Pat. No. 5,051,947, High-speed single-pass textual search processor for locating exact and inexact matches of a search pattern in a textual stream, Jun. 6, 1978.

U.S. Pat. No. 4,760,523, Fast search processor, Jul. 26, 1988.

Being complex logic devices, special purpose processors were not only expensive to produce (product cost exceeding $10,000) but also subject to failure rates that frustrated operational users. Further, the designs were neither scalable nor extensible. The method of performing character/character set comparisons limited them to pattern matching rather than pattern recognition.

U.S. Pat. No. 4,747,072, Pattern addressable memory, May 24, 1988. Performance shortfall from rule based active construction of variable content in key words. Does not accommodate equivalence classes.

United States Patent Publication 2003/0055799, Self-organizing data driven learning hardware with local interconnections. Does not handle equivalence classes. Throughput shortfall.

U.S. Pat. No. 4,531,201. Patterns limited in length to size of shift registers.

U.S. Pat. No. 4,625,295. Can handle 16-bit characters at loss of throughput. Length of shift registers limits length of words. Cannot detect Kleen Closures. Decoder requires a delay to decode a character. Does not handle equivalence classes.

Being ever more complicated, logic devices using parallelism for throughput in various string pattern matching scenarios each exhibited cost limitations and were limited in scalability as well. Also, precise internal timing of the logic circuits made it nearly impossible to re-implement them as semiconductor technology advanced.

Associative Memories and Contents Addressable Memories have been used to reduce the number of clock cycles required to fetch data into registers. While improving performance these approaches do not reduce costs and none to date have yielded significant improvements regarding the acuity measure of effectiveness.

United States Patent Publication 2004/0123071, Cellular engine for a data processing system. Matching device. Does not support Boolean, semantic or set theory logic.

United States Patent Publication 2004/0080973, Associative memory, method for searching the same, network device, and network system. Associative memory carries out a search operation in plural fields. Does not appear to support complex reference patterns. Three memories, three cycles indicates shortfalls in throughput and acuity.

United States Patent Publication 2003/0229636, Pattern matching and pattern recognition system, associative memory apparatus, and pattern matching and pattern recognition processing method. Recognizes words but not phrases and requires multiple cycles.

United States Patent Publication 2003/0014240, Associative memory device with optimized occupation, particularly for the recognition of words. Spreadsheet approach, relationships among classes not supported. Logic limited.

United States Patent Publication 2004/0250013, Associative memory system, network device, and network system. Includes Reset to find second instance of a pattern. Does not support equivalence classes.

Neural Net based recognizers have been used for string pattern matching in order to implement rapidly adaptive reference patterns. These have proven effective in specific applications such as email spam signature identification and adaptive tracking but do not exhibit the speed and performance for general application.

United States Patent Publication 2005/0049984, Neural networks and neural memory. Does not support equivalence classes.

United States Patent Publication 2002/0059152, Neural processing module with input architectures that make maximal use of a weighted synapse array. Symbol syntax but not semantics.

United States Patent Publication 2002/0032670, Neural network processing system using semiconductor memories. Aggregations are linear.

Application-specific devices have been devised for pattern matching of 2D and 3D images, but do not have the Boolean, semantic and set theory logic.

United States Patent Publication 2002/0125500, Semiconductor associative memory. Emphasizes processing versus.use of memory and systolic operations. Shortfall in throughput and cost.

United States Patent Publication 2002/0168100, Spatial image processor. Assumes location implicit relationships in data stream (e.g., pixels).

United States Patent Publication 2003/0194124, Massive training artificial neural network (MTANN) for detecting abnormalities in medical images. Uses sequential stored program.

United States Patent Publication 2004/0156546, Method and apparatus for image processing. Defines three categories of processing, object-independent processing a plurality of processors each of which is associated with a different one of the pixels of the image, object-dependent processing using a symmetric multi-processor. The plurality of processors may form a massively parallel processor of a systolic array type and configured as a single-instruction multiple-data system, and object composition, recognition and association, using a unified and symmetric processing of N dimensions in space and one dimension in time. The plurality of processors is formed on a semiconductor substrate different from the semiconductor substrate on which images are captured.

Systolic Arrays use pulse propagation through preformed switching networks to parallelize logical relationships without resorting to the von Neumann paradigm. These are much faster and less expensive than sequential processors. Inventions and embodiments to date have been application specific and have not allowed sufficiently quick reconfigurations of the switching network.

The more particularized field of the present invention started with machines that detected Match or No Match, one term at a time. Next came full Boolean operators across collections of terms. Then the addition of Don't Care logic to the Match, No Match choices allowed detection of partial matches. Delimiters enabled detection of syntactic clues such as end of word, end of sentence, end of paragraph, end of section, end of file, end of record, etc. Next came detecting strings of terms (e.g., phrases). Throughout was the presumption that the search would be composed and expressed by humans in the form of queries. Search engines or adjunct software did not greatly aid how humans formulated queries. Linguists created very sophisticated preprocessing and post processing software but these did not make significant improvements in acuity, throughput, scalability or cost, let alone improving all at the same time. The field of artificial intelligence paralleled the search engine field but without significant cross-disciplinary sharing.

Many of the advancements were paced by Moore's price/performance law in the semiconductor field. The field of artificial intelligence paralleled the search engine field but unfortunately without significant cross-disciplinary sharing. The advent of knowledge management in the 1990's made many more people aware of lexicons and taxonomies, the [then] means of expressing the relationships among entities in addition to describing the entities. The advent of semantic web development in 2001 intended to enable computers to interchange data based on the meaning of the data instead of just on its location in a format has fostered expressions of knowledge models as formal ontologies.

Set theory has proven useful for making assertions about relationships. The advent of digital image patterns search has advanced its use considerably. Currently, set theoretic expressions are as prevalent as Boolean logic and algorithmic operators. This has prompted distinctly new machine architectures featuring systolic arrays and data flow-facilitation examples. Interest is now refocusing from facilitation of computer system data interchanges to facilitation of human knowledge interchanges and to facilitation of interchanges among diverse, distributed systems of humans. Applying digital devices to the disambiguation of human communications is the next wave in this field. The astounding complexity of this challenge motivates development of a general purpose machine that can execute a variety of such expressions. The present invention provides such a method and apparatus.

In order to locate all of the data objects relevant to a given referent and only those objects it is necessary to overcome the heterogeneity of the subject data. Heterogeneity exists on two levels. The first level for digital text is transcription variation such as differences in spelling, spelling errors, typographical errors, punctuation differences, spacing variation, the presence of "special" bytes used to control the display or transmission medium but which themselves carry no meaning, and recently, obfuscation characters intended to spoof spam detectors. A popular example of the latter is:

"Aoccdrnig to a rscheearch at Cmabrigde Uinervtisy, it deosn't mttaer in waht oredr the ltteers in a wrod are, the olny iprmoetnt tihng is taht the frist and lsat ltteer be at the rghit pclae. The rset can be a total mses and you can sitll raed it wouthit a porbelm. Tihs is bcuseae the huamn mnid deos not raed ervey lteter by istlef, but the wrod as a wlohe."

Cognates in other types of digital data are, for example: DNA spelling errors, Background noise, and Varying pronunciation.

The second level of heterogeneity is the semantic level. Humans are gifted inventors of different ways of expressing the same idea. This means that for every component of a referent many variations may be possible (varying sentence and paragraph structuring, and many figures of speech (synonyms, allegory, allusion, ambiguity, analogy, eponym, hyperbole, icon, index, irony, map, metaphor, metonym, polysemous meaning, pun, sarcasm, sardony, sign, simile, synecdoche, symbol, token, trope) and class, subclass, idioms, and super class words and expressions).

Accordingly, rather than looking for the occurrences of a word or phrase, or even a few words or phrases, in a body of text, Ashbys Law of Requisite Variety (for appropriate regulation the variety in the regulator must be equal to or greater than the variety in the system being regulated) demands a way of finding all of the expressions equivalent to a set of referents. A responsive machine must be able to process set theoretic operators as well as Boolean operators and semantic operators such as precedence (both ordinality and cardinality) and aggregation. In this document the set of strings equivalent to a referent is called an equivalence class. A description of the members of an equivalence class is called a Reference Pattern.

Acuity is achieved by providing a means to scan a data stream for content that fulfills Reference Patterns of sufficient selectivity and sensitivity to perceive just the digital objects of interest. Simultaneously, throughput, scalability and cost must be achieved as well.

BRIEF SUMMARY OF THE INVENTION

The present invention is of a general purpose, set theoretic processor (and concomitant method) comprising: a recognition network comprising a state-change routing matrix, an ordered plurality of detection cells, and a reaction memory; a pattern memory; an aggregation network comprising an aggregation routing matrix and a threshold logic; and a local clock and sequencer. In the preferred embodiment, the processor operates in modes of operation comprising load mode, scan mode, and test and diagnostic mode. The state-change routing matrix provides a reticulum of latent connections from any set of source detection cells to any set of successor detection cells. A reference pattern establishes actual pathways through the state-change routing matrix from source to successor cells. The plurality of detection cells comprises 1024 or more cells, wherein each of the detection cells is associated with one column of the pattern memory, each of the detection cells is a finite state machine having two states, and the latent reaction of each of the detection cells to any given input value is specified by the contents of the reaction memory and whose manifest reaction is determined by the cell's current state acting on its latent reaction. The pattern memory is conventionally addressed in load mode and test and diagnostic mode with one word of at least 1024 bits being written to or read from a multiplexer/de-multiplexer at a time; and in scan mode four words of at least 1024 bits each are accessed in parallel to generate in parallel two results words (detection cell response and next state) of at least 1024 bits each. Reactions of all detection cells are determined simultaneously, in parallel. The threshold logic comprises a plurality of group threshold logic cells, wherein the aggregation routing matrix provides potential connections between each the detection cell and each group threshold logic cell, a reference pattern establishes actual connections between detection cells and group threshold logic cells, a reference pattern determines whether an output from the detection cell it connects to a group threshold logic cell will be transmitted to the group threshold logic cell on every occurrence or only once, the group threshold logic cells are initialized at the beginning of a scan mode, and each of the group threshold logic cells has a 1 bit output. All processing is accomplished on source data provided to the processor in one systolic cycle per source data input. The processor recognizes strings in source data that fulfill a reference pattern specification of a set of fixed and variable component substrings comprising one or more of fixed strings of primary input components, strings in which relative locations can have one of a number of different values, strings in which a value or set of values can repeat zero or more times, and strings in which one or more substrings can have one of a number of alternative values. The source data is any of the following: nucleotide sequences; amino acid sequences; speech pattern sequences; lexicographic sequences; signal analysis sequences including electromagnetic, optical, acoustic or seismic data sequences; sequences derived from a graphic image including x-ray images, CAT scan images, MRI images, television images, fingerprint images, and photographic images; pixel location data; law enforcement related sequence data including fingerprint data, voiceprint data, and genetic profile data; and sequence data comprising gene expression profiles.

Bandwidth is necessary for both acuity and throughput. A primary object of the invention is to provide a 10-fold to 100-fold advancement with respect to current architectures if implemented in the same technology. A principal approach is to trade space for logic by using a random access memory with minimal added logic and control functions.

Another object of the invention is to minimize process steps, using systolic techniques wherever possible, and to trade space for logic by using random access memory with minimal logic and control functions.

A further object of the invention is to provide an agile architecture featuring a framework and module arrangement that can accommodate expansion or contraction of throughput, repertoire and level of language without affecting existing capabilities and behaviors.

Other objects of the invention include:

A combination of a Recognition Network and an Aggregation Network that can achieve significant improvements in information extraction acuity.

Use of a reference pattern (description of patterns whose presence in a data entity indicates a high probability that that entity is relevant to a subject of interest) as the basis for the microcode (state table, initial state values, switch settings, and logic thresholds) needed to program the two above mentioned networks.

Construction of the above noted Networks within a single semiconductor device, which can then be used to exploit data paths orders of magnitude greater than achievable across multiple semiconductor devices and processing speeds not achievable across multiple semiconductor devices.

Use of the above networks for extraction of data by reference patterns sufficiently complex to distinguish relevant data from non-relevant data to an acuity not achievable by existing methods at comparable speed performance.

Use of the above networks to improve extraction acuity without degradation of speed as the query becomes more complex to achieve improved acuity.

A network that does not suffer degradation of speed depending on the number of hits that are found within the data being searched.

Advantages of the invention include: (1) Enabling user control of acuity through choices about the extent and content of the reference pattern (RP); (2) Enabling user confidence in results by providing a device integrity check that may be run at any time; (3) Enabling user invocation of not only variations on a reference word (e.g., plural forms) but also invocation of equivalent words and phrases (e.g., cat, feline, Tabby); the preferred embodiment is 1024 cells ) but up to one million cells are consistent with VLSI implementation media circa 2005.

The invention provides fungibility advantages, with a cost low enough to have this device beside every Cpu and every Read Head thus leveraging Metcalf's Law. There is a low cost of ownership through a combination of low cost of device, configurability as a co-processor in a general purpose computing system. Thanks to computer preprocessing of source data not being required, adjunct software complexity is minimized, and results in one systolic cycle per input.

High scalability accommodates the span of reference patterns and volumes of data to be searched. An objective is a 10-fold relaxation of limits on span and volume over current technology. A principal approach is to abstract the semantic and set theory logic and unify them in a highly parallel, extensible architecture.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention, and include the reference numerals described below. In the drawings:

FIG. 6 is a functional diagram explaining the Counter Representation method;

FIG. 12 is a functional diagram of examples of State-Change Routing Matrix methods;

INDEX OF REFERENCE NUMERALS

Figure 1:
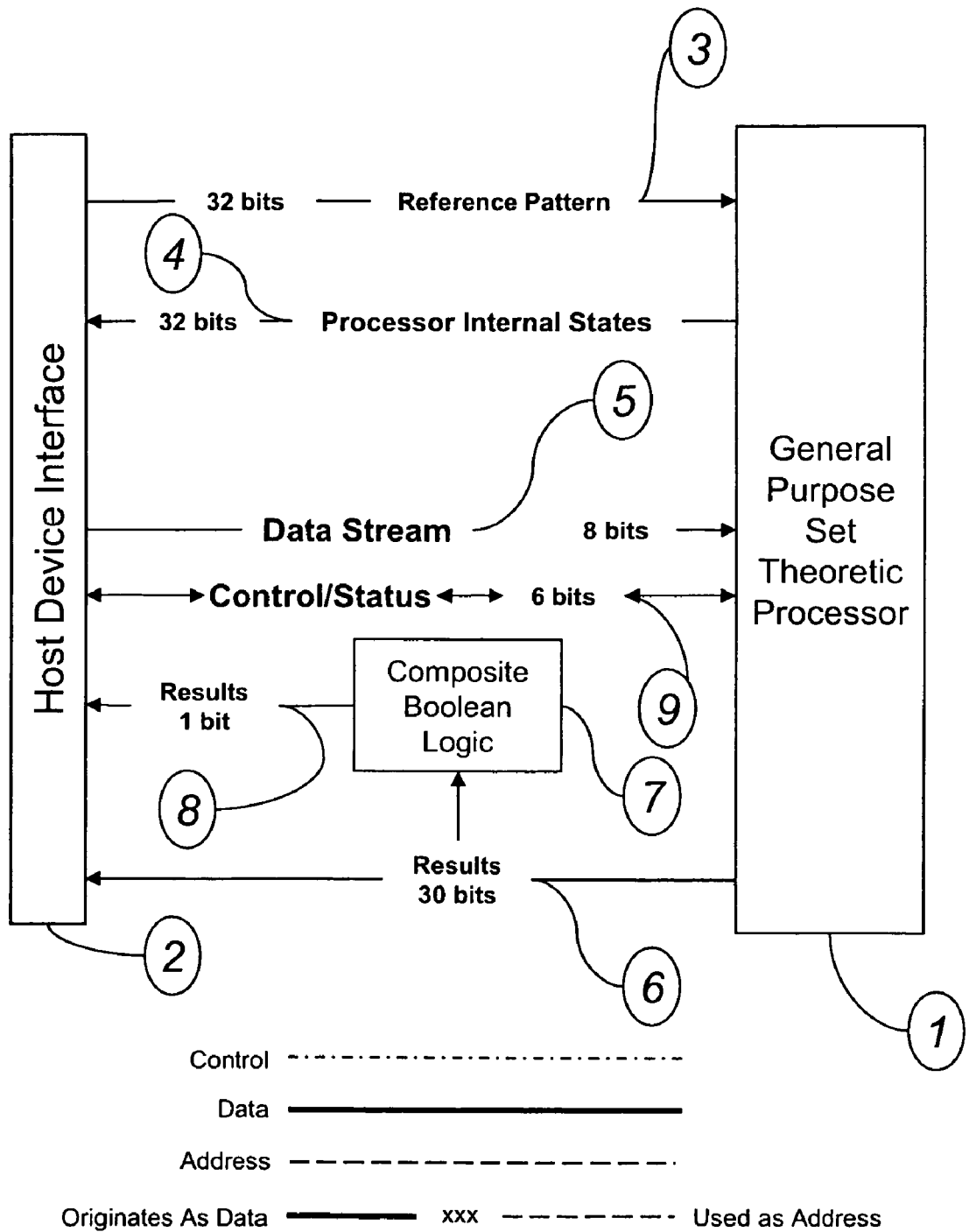
FIG. 1 is a block diagram of the present invention in a representative configuration.

| Reference Numeral | Named Item | Figure # |
|---|---|---|
| 1. | Set Theoretic Processor | 1 |
| 2. | Host Device Interface | 1 |
| 3. | Reference Pattern | 1 |
| 4. | Processor Internal States | 1 |
| 5. | Data Stream (input byte b as address) | 1 |
| 6. | Results | 1 |
| 7. | Composite Boolean Logic | 1 |
| 8. | Results From CBL | 1 |
| 9. | Control Status | 1 |
| 10. | Row Address Decoder | 2 |
| 11. | 32-1024 Multiplexer/De-multiplexer | 2 |
| 12. | Recognition Network | 2 |
| 13. | Sequencer | 2 |
| 14. | Pattern Memory | 2 |
| 15. | Aggregation Network | 2 |
| 16. | 10 bit Pattern Memory row address | 3 |
| 17. | Pattern Memory Selected Row (R/W) | 3 |
| 18. | Row Address Decoder Control | 3 |
| 19. | Pattern Memory Control | 3 |
| 20. | Multiplexer/De-multiplexer Control | 3 |
| 21. | 1024 bit Pattern Memory word | 3 |
| 22. | 8 bit Selected Reaction Triple Rows ($MR_b$, $MS_b$, $MA_b$) | 4 |
| 23. | Composite Boolean Logic Control | 4 |
| 24. | Response Result ($S_i \wedge MR_{i,b}$) for $DC_i$ | 4 |
| 25. | Reaction Memory | 5 |
| 26. | $MA_{b,i}$—Auto-Enable bit for input byte b and $DC_i$ | 5 |
| 27. | $MR_{b,i}$—Response bit for input byte b and $DC_i$ | 5 |
| 28. | $MS_{b,i}$—Successor-Enable bit for input byte b and $DC_i$ | 5 |
| 29. | $DC_i$—Detection Cell i | 5 |
| 30. | Successor-Enable output ($S_i \wedge MS_{i,b}$) for $DC_i$ | 5 |
| 31. | Successor-Enable for $DC_i$ from its Precursors | 5 |
| 32. | State-Change Routing Matrix | 5 |
| 33. | C the clock signal from the sequencer | 5 |
| 34. | INI—Initiate Command | 8 |
| 35. | $IS_i$ initial state value for $DC_i$ | 8 |
| 36. | Reverse Propagation from $SRC_{j,i}$ | 10 |
| 37. | Forward Propagation to $SRC_{j,i}$ | 10 |
| 38. | Enable Disjunctive "Sum" into $SRC_{j,i}$ | 10 |
| 39. | State-Change Routing Cell j, i | 10 |
| 40. | Forward Propagation from $SRC_{j,i}$ | 10 |
| 41. | Reverse Propagation to $SRC_{j,i}$ | 10 |
| 42. | Enable Disjunctive "Sum" from $SRC_{j,i}$ | 10 |
| 43. | Aggregation Routing Matrix | 14 |
| 44. | Group Logic Lines | 14 |
| 45. | Threshold Logic | 14 |
| 46. | Aggregation Routing Cells | 15 |
| 47. | Group Logic Line entering $ARC_{m,n}$ | 15 |
| 48. | Group Logic Line exiting $ARC_{m,n}$ | 15 |
| 49. | Group Threshold Logic$_i$ | 17 |
| 50. | $TL_i$ Threshold Logic Output for $GTL_i$ | 17 |
| 51. | Auto-Enable output ($S_i \wedge MA_{i,b}$) for $DC_i$ | 18 |
| 52. | Write the state $S_i$ for $DC_i$ control line | 18 |
| 53. | Next State $S'_i$ for $DC_i$ | 18 |
| 54. | $S_i$ the current state of $DC_i$ | 18 |
| 55. | Accept Reverse Propagation | 19 |
| 56. | Accept Forward Propagation | 19 |
| 57. | Forward Propagation Switch | 19 |
| 58. | Reverse Propagation Switch | 19 |
| 59. | Select Reverse Propagation | 19 |
| 60. | Select Forward Propagation | 19 |
| 61. | Select Logic Group j for $DC_i$ | 20 |
| 62. | Not (Select Logic Group j for DCR Latch Bit) | 20 |
| 63. | Latch-No-Latch for Logic Group j × $DC_i$ | 20 |
| 64. | Not(Response Latch bit for Logic Group j × $DC_i$) | 20 |
| 65. | Response Latch bit for Logic Group j × $DC_i$ | 20 |
| 66. | Threshold Logic Counter i | 21 |
| 67. | Threshold Initial Value | 21 |

DETAILED DESCRIPTION OF THE INVENTION

The present invention relates to the field of digital electronic devices for recognizing specified patterns in a data stream specifically claimed is a general purpose architecture and device for set theoretic processing. This type of processing arises in many different fields of endeavor, but can be understood more easily in terms of a search of an alphanumeric data base, not to locate all the occurrences of a particular word or phrase, but to locate all of the data objects (documents, images, DNA base sequences, audio clips) relevant to a given issue (referent) and only those data objects.

As shown in the drawings for purposes of illustration, the present invention is of a high bandwidth general purpose set theoretic processor (GPSTP) capable of perceiving complex patterns in a digital symbol stream at data rates orders of magnitude faster than conventional computers implemented in the same semiconductor technology (feature size and gate speed). The processor is capable of implementation on a single semiconductor chip. The processor is unaffected by the meaning of the symbols provided that the Reference Pattern is formulated assuming the same symbol set as that of the symbol stream. The processor will perform equally well with text (without regard to code- ASCII, EBCDIC, BCD), gray-scale pixel values, DNA sequences, digital audio, or any other digital information.

The following definitions are used in descriptions below, but numerical values are not intended to be limiting (e.g., the number of bits in the columns and rows of Pattern Memory):

GLOSSARY

| Vocabulary Term or Symbol | Meaning |
| --- | --- |
| $\wedge$ (A$\wedge$B) | Binary conjunctive (AND) operator if A and B are one bit binary values, A$\wedge$B = 1 if and only if A = 1 and B = 1. |
| v (AvB) | Binary disjunctive OR operator if A and B are one bit binary values, A$\wedge$B = 1 if either A = 1 or B = 1. |
| $\cap$ (A$\cap$B) | Binary conjunctive operator for multiple bit arguments. If A = $(A_1, A_2, \ldots A_n)$ and B = $(B_1, B_2, \ldots B_n)$ are n-bit binary "words" A $\cap$ B = $(A_1\wedge B_1, A_2\wedge B_2, \ldots A_n\wedge B_n)$. |
| $\cup$ (A $\cup$ B) | Binary disjunctive operator for multiple bit arguments. If A = $(A_1, A_2, \ldots A_n)$ and B = $(B_1, B_2, \ldots B_n)$ are n-bit binary "words" A $\cup$ B = $(A_1 v B_1, A_2 v B_2, \ldots A_n v B_n)$. |
| $\cap (A_1, A_2, \ldots A_n)$ | Conjunctive summation. $\cup(A_1, A_2, \ldots A_n)$ = 1 if all Ai = 1 ($1 \leq i \leq n$). |
| $\cup(A_1, A_2, \ldots A_n)$ | Disjunctive summation. $\cup(A_1, A_2, \ldots A_n)$ = 1 if any Ai = 1 ($1 \leq i \leq n$). |
| Aggregation Network | A plurality of switches that map the outputs of Detection Cells to threshold logic elements. |
| Byte | Eight bits. Can be treated as a binary numbers having values 0 to 255 or as a symbol. |
| Auto-Enable Bit | A bit in the auto-enable memory (see MA); A bit that affects the next state of the Detection cell with which it is associated |
| Detection (of input byte "b" by Detection Cell DCi) | The state of affairs in which b is the current input byte, $DC_i$ is in the "ON" state and one bit of its Reaction Triple addressed by b is 1. The state of affairs in which $S_i$ = 1 and [$MA_{b,i}$ = 1, $MS_{b,i}$ = 1, or $MR_{b,i}$ = 1] |
| Detection Cell ($DC_i$) | The fundamental detection unit of the present invention. A programmable two state ("On" or "OFF", equivalently "Enabled" or "Disabled") deterministic finite state automaton configured by a Detection Specification to detect a specific set of byte strings |
| Detection Specification | See Feature |
| Enabling Propagation Path (from Feature $F_n$ to Feature $F_m$) | A set of switches in State-Change Routing Matrix cells that allow $F_n$ to enable $F_m$, (n $\neq$ m). |
| Feature | The set of 256 Reaction Triples in a Detection Cell's Reaction Memory that determine the cell's behavior. |
| Memory, Auto-Enable (MA) | The 256 × 1024 bit memory of bits that affect a detection cell's own next state. $MA_{b,i}$ designates the auto-enable bit corresponding to input byte "b" for Detection Cell $DC_i$. |
| Memory, Control (MC) | The 256 × 1024 bit memory of state and switch settings. |
| Memory, Response (MR) | The 256 × 1024 bit memory of response bits. $MR_{b,i}$ designates the response bit corresponding to input byte "b" for Detection Cell $DC_i$. |
| Memory, Successor-Enable (MS) | The 256 × 1024 bit memory in which successor enable bits are stored. $MS_{b,i}$ designates the Successor-Enable bit corresponding to input byte "b" and Detection Cell $DC_i$. |
| Pattern Memory | The 1024 × 1024 bit random access memory in which a reference pattern is stored. The pattern memory can be thought of as a control store and its contents as a micro program. |
| Pattern Memory Row $PM_r$ | The 1024 bit "word" located at Pattern Memory row address r. The current state occupies $PM_0$, for example. |
| Precursor (of a feature $F_m$) | A Feature $F_n$ (m $\neq$ n) is a Precursor of $F_m$ if it has at least one Successor-Enable bit set to "1" = "True" and there is an Enabling Propagation Path from $F_n$ to $F_m$. |
| Reaction (of a Detection Cell DCi to an input byte b) | The Reaction Triple $RM_{b,i}$ masked by the current state S. (Si$\wedge MR_{b,i}$, Si$\wedge MS_{b,i}$, Si$\wedge MA_{b,i}$) |
| Reaction Memory (RM) | Memories MA, MS, MR taken together; $RM_0$, $RM_1, \ldots, RM_{1024}$. |
| Reaction Memory$_i$ for $DC_i$ ($RM_i$) | The three 256 bit memories $MA_i$, $MS_i$, $MR_i$ corresponding to $DC_i$. The Reaction Triple corresponding to $DC_i$. |
| Reaction Triple ($RM_{b,i}$) | For a given byte from the source data the three bits $MR_{b,i}$, $MS_{b,i}$, $MA_{b,i}$ stored at row address "b" in $RM_i$ |
| Recognition Network | A $2^{1024}$ state deterministic finite state automaton that accepts source data and determines the presence or absence of meaningful content as recognized by one or more Yerms executed in parallel. The totality of Detection Cells together with the Reaction Memory, and State-Change Routing Matrix |
| Reference Pattern | A description (generalized according to the present invention) of a referent that the invention uses to recognize members of the referent's equivalence class; The totality of bits in the Pattern Memory. |
| Referent | An expression of topical content of interest to a person using the invention. For example, a sequence of DNA bases for a specific gene, or an English phrase. |
| Referent Equivalence Class | The subset of digital expressions in a body of source data equivalent to a referent relative to an ontology: for example the set of variants of the referent gene in a collection of genomes that differ from the referent gene by missing or additional bases, substituted bases, reversed neighbor bases, etc. |
| Response Bit | One of 256 bits in the pattern memory for a given Detection Cell that causes an output from the cell when the cell is in the "ON" state and receives an input byte whose binary value equals the address of the bit. For input byte b the Response Bit for DCi, is denoted $MR_{b,i}$. |
| Response Result | The 1024 bits S $\cap$ $MR_b$ passed from the Recognition Network to the Aggregation Network |

-continued

| Vocabulary Term or Symbol | Meaning |
|---|---|
| | at clock signal C. It tells the Aggregation Network which Terms have been satisfied for the current input byte b. If the $n^{th}$ bit $S_n \hat{\ } MR_{b, n} = 1$, the term ending in $DC_n$ has been recognized for the current input byte. |
| Scan | Pass a stream of bytes to the invention. The term "search" is sometimes used when the source is a data store or archive. But Scan will be used here throughout because the nature of the data source has no effect on the invention. |
| State (S) of the Recognition Network | The totality of the states $S_i$ of the Detection Cells. $S = (S_0, S_1, \ldots S_{1023})$ |
| State ($S_i$) of a Detection Cell ($DC_i$) | A one bit memory whose value "On" $\equiv$ 1 or "OFF" $\equiv$ 0 is the state of $DC_i$. $S_i$ is coincident with $PM_{0, i}$ |
| State-Change Routing Matrix | A matrix that connects Precursor Detection Cells to Successor Detection Cells. |
| Term (Complex) | A set of (alternative) Term Prefixes (prefix set) followed by a set of one or more alternative Term Infixes (infix set), followed by a set of one or more alternative Term suffixes (suffix set) where every infix has at least one precursor in the in the prefix set and every suffix has at least one precursor in either the prefix or infix sets. |
| Term (Simple) | A Term Prefix followed immediately by a Term Infix followed immediately by a Term Suffix. |
| Term Infix | A contiguous set of features having at least one Successor-Enable bit set to "1" $\equiv$ "True" and at least one Precursor. |
| Term Prefix | A contiguous set of features having at least one Successor-Enable bit set to "1" $\equiv$ "True", beginning with a feature that is initialized "On" and configured to remain "On" (that is, with all of its self-enable bits initialized "ON". |
| Term Suffix | A contiguous set of features each (except the last) having at least one Successor-Enable bit set to "1" $\equiv$ "True", having at least one Precursor and terminated by a feature with at least one "response bit" set to "1" $\equiv$ "True" |

Overview

In order to locate all of the data objects relevant to a given referent and only those objects it is necessary to overcome the heterogeneity of the source data. Heterogeneity exists on two levels. The first level in the case of digital text is transcription variation:

Differences in spelling,
Spelling errors,
Typographical errors,
Punctuation differences,
Spacing variation,
The presence of "special" bytes used to control the display or transmission medium but which themselves carry no meaning.

Cognates in digital data other than text are, for example:
Lighting variations,
DNA spelling errors,
Background noise, and
Varying pronunciation.

The second level of heterogeneity is the semantic level. Humans are gifted inventors of different ways of expressing the same idea. This means that for every component of a referent many variations may be possible (varying sentence and paragraph structuring, and many figures of speech (synonyms, allegory, allusion, ambiguity, analogy, eponym, hyperbole, icon, index, irony, map, metaphor, metonym, polysemous meaning, pun, sarcasm, sardony, sign, simile, synecdoche, symbol, token, trope) and class, subclass, idioms, and super class words and expressions).

Accordingly, rather than looking for the occurrences of a word or phrase, or even a few words or phrases, in a body of text, the aforementioned acuity objective demands a way of finding all of the expressions equivalent to a set of referents The set of strings equivalent to a referent is called an equivalence class. A specification of the members of an equivalence class is called a Reference Pattern.

The purposes of the present invention are; to provide a means to scan a data stream for content qualified by Reference Patterns, to enable users to specify referents of sufficient selectivity and sensitivity to perceive just the digital documents and other digital objects of interest, to provide the bandwidth to do so at useful speeds, and to minimize the cost of a device that satisfies all these.

The invention takes a generalized approach. Rather than dealing with character variation for spelling differences, extra characters, missing characters, variable numbers of repeated characters; it employs a (byte) with that can be configured to deal any one or combination of these challenges as special cases. The use of "byte" in the previous sentence rather than "character" is deliberate and important to understanding the invention. A byte value is a digital object consisting of eight binary digits (represented variously as open and closed switches, high voltage low voltage, etc.) interpreted as zeros and ones, "ON" and "OFF", "True" and "False", "Yes" and "NO". The eight bits taken together as a byte are interpreted as a binary number with decimal equivalent between 0 and 255, as a symbol for a character using a particular coding scheme (anciently called a sort sequence as a legacy of punched card sorters), as a value in a gray scale, a sound, a musical note. The invention operates on digital objects (for the embodiment being discussed, bytes). It is neutral with respect to what the digital objects represent. It is also generalized with respect to the number of bits in a digital object; a different embodiment using the same principles and structure can be realized for two bit objects (two bits are all that are needed to represent the four bases—A, C, G, T—in DNA sequences, e.g.).

The Detection Cell is a deterministic finite state machine. Its behavior is determined by the current byte in the input stream, by its current state, and by the contents of its reaction memory (state transition and output tables). It has two possible current states "ON" and "OFF" ("Enabled" and "Disabled" will be used as alternate words for states and "Enable" and "Disable" for "Turn ON" and "Turn Off" or "set to the "ON" state, etc., to avoid clumsy construction.). A Detection Cell's Reaction Memory has a location for each possible byte value. It is from this property that generality with respect to byte interpretation and transcription variation derives. With respect to interpretation, a Detection Cell's Reaction Memory entry for a given byte value depends on the meaning of that byte value in the coding scheme of the input. To detect the letter "P" in an EBCDIC input stream one Reaction Memory entry will be used. If the input stream is ASCII or "Tilt and Swivel" code, different entries will be necessary. To convert Reaction Memory entries from one coding scheme to another, it is only necessary to reorder them. If the coding scheme of an input stream is either unknown or mixed, different sets of detectors can be setup for different coding schemes to determine which is used or to scan for content in mixed streams. To deal with transcription variations, an individual detector can be configured to detect any member of a set of input bytes (any vowel) for example to overlook the common error of vowel substitution. Another Detection Cell can be set to detect any word boundary character (that is, the byte values corresponding to punctuation spaces, and other characters that separate words). A Detection Cell configured to detect a character in a word can also be configured to ignore formatting bytes such as line-feed and carriage return bytes in order to be able to recognize words that start on one line and end on another; and another Detection Cell configured to detect word boundary bytes to include formatting bytes in the list of bytes to which they will respond. To deal with variable white space a single Detection Cell can be configured to accept an unspecified number (zero or more) of word boundary bytes followed by the first byte of a word.

Shown in FIG. 1 is a typical operational configuration for the GPSTP. The host provides Reference Patterns and access to data sources and accepts results. The host can be a desktop computer, a server, a network, a router. Control and status are communicated between the Host Device Interface indicated by reference numeral 2 and the GPSTP 1 over line 9. The GPSTP operates in three modes, Load, Diagnostic, and Scan. To prepare for a Scan, a Reference Pattern is loaded into the GPSTP by the Host Device Interface over line 3. The Reference Pattern, consisting of up to 1 Mb ($2^{20}$ bits) is transferred to the GPSTP, 32 bits at a time from a Reference Pattern image previously compiled and stored in the Host. Diagnostic mode allows GPSTP internal states 4 to be read into the Host. Diagnostic mode can be used to verify that a Reference pattern has been successfully transferred. It can also be used to read out selected data from the GPSTP after each input byte as data is scanned in a step by step fashion to verify correct operation. In Scan mode data are passed from the data source by the Host Device Interface to the GPSTP one byte at a time over line 5. The GPSTP in two internal clock cycles determines the state of satisfaction of recognition terms up to the current byte and places this result on line 6 to the Host Device Interface directly and to the Composite Boolean Logic 7. A result consists of 30 bits from the GPSTP that indicate whether each of 30 logic thresholds has been reached. The Composite Boolean Logic determines whether the input stream up to the current byte has fulfilled the Reference Pattern and outputs this determination over line 8 to the Host Device Interface. The identity of the current input byte is available in the Host Device interface along with the 31 result bits. Host response to and disposition of the result is determined by Host software depending on how the GPSTP is being used.

Figure 2:
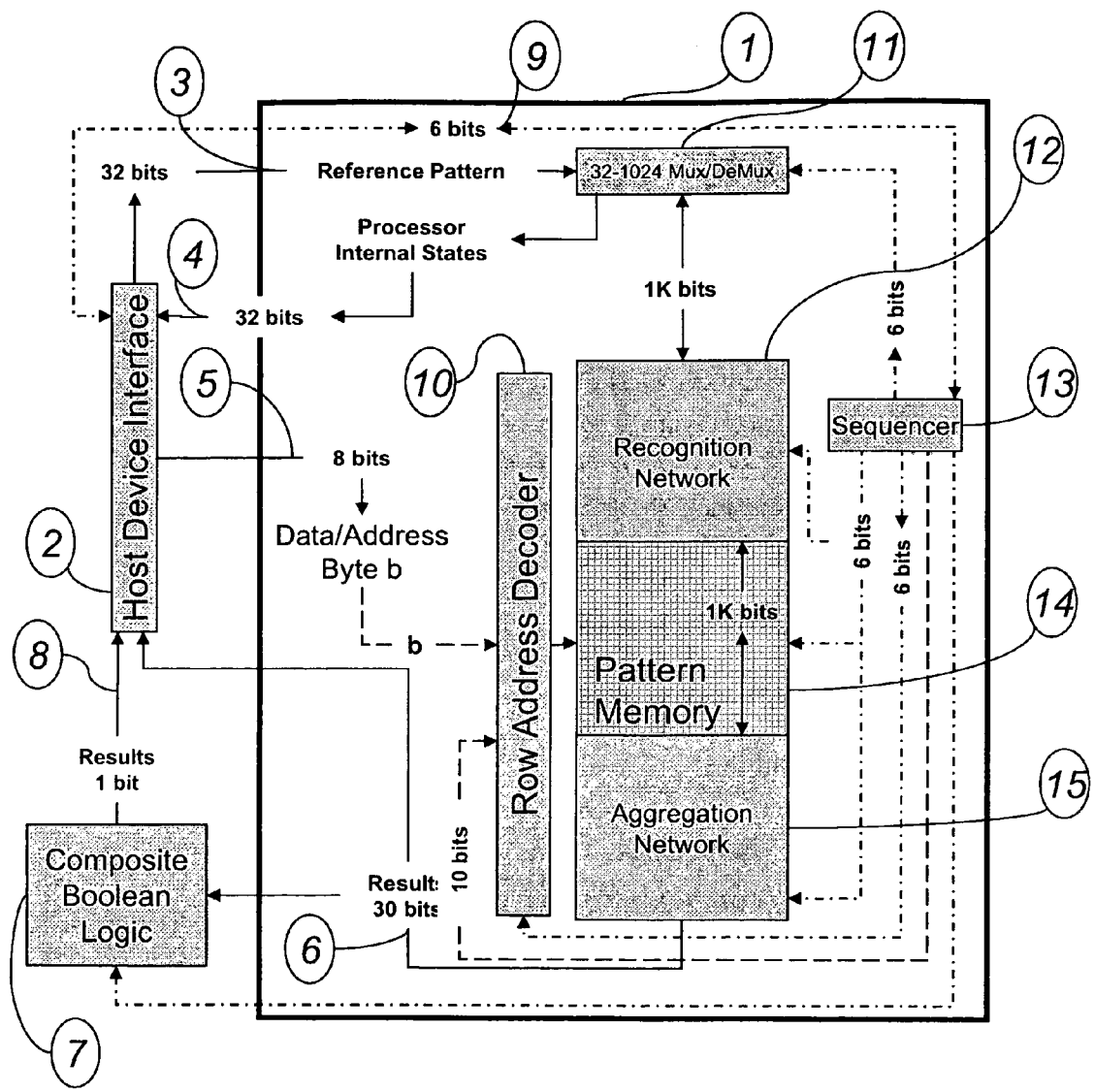
FIG. 2 is a block diagram showing preferred GPSTP components.

As shown in FIG. 2 the processor, indicated by reference numeral 1, is made up of a 1 K×1 K bit Pattern Memory 14, two networks: 12 Recognition Network, and 15 Aggregation Network and three supporting components: 11 a 32-to-1024 Multiplexer/De-multiplexer, 10 Row Address Decoder, and 13 Sequencer. The Host Device Interface may be embodied by a standard off-the-shelf interface, which may vary depending on the host device and particular application. The Composite Boolean Logic 7 is a 1 Gb random access memory. The invention assumes that the host device provides access to one or more data sources and a random access memory into which results can be written. Neither the Host Device Interface nor the Composite Boolean Logic 7 is a part of the present invention.

Figure 3:
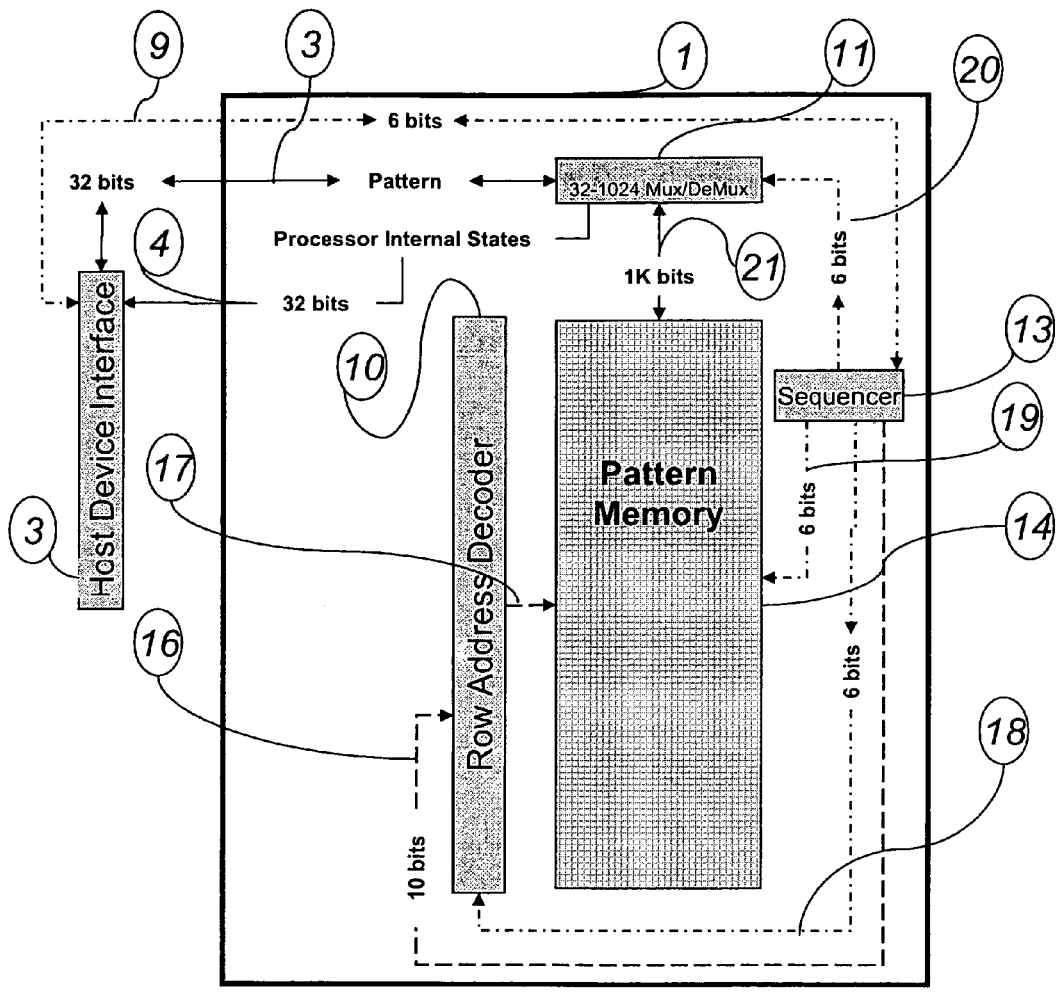
FIG. 3 is a block diagram of GPSTP Conventional Memory Structure, Load mode.

The Pattern Memory stores a Reference Pattern of $2^{20}$ bits (1024×1024) that determine the response of the device to patterns in the input stream. The Pattern Memory is dual structured. As shown in FIG. 3 the Pattern Memory 14 is structured as a conventional random access memory. In the load mode the Row Address Decoder 10 spans all 1024 rows of the Pattern Memory, and given a ten bit address via line 16, enables exactly one row to be read or written. Entire 1 K bit rows are written to the Pattern Memory from the Multiplexer/De-multiplexer 11 and read from the Pattern Memory to the Multiplexer/de-Multiplexer in parallel. The invention uses this conventional memory structure to load reference patterns and to read contents of the Pattern Memory when detailed internal state data are needed and for diagnostic and testing purposes. The conventional memory structure is not used during scan mode.

Line 3 is the data path between the Host Device Interface 16 and the Multiplexer/de-Multiplexer. It is used to load Reference Patterns into the Pattern Memory. Line 4 is used to read the contents of the Pattern Memory. Line 9 is used for the Host Device Interface and Sequencer 13 to communicate commands and status. Line 20 is used by the Sequencer to control the Multiplexer/de-Multiplexer. Line 17 is a row select/enable line (one of 1024) used to select the row specified by the binary value of the 10 bits supplied by line 16. Line 16 is used by the Sequencer to direct Reference Pattern data to the correct row and to specify which row is to be read in a Read from Pattern memory operation. Line 19 is used by the Sequencer to command the Pattern Memory (in load and diagnostic modes) to write to and read. Line 18 is used by the Sequencer to set the mode (Load, Diagnostic, Scan) of the Row Address Decoder 10.

Figure 4:
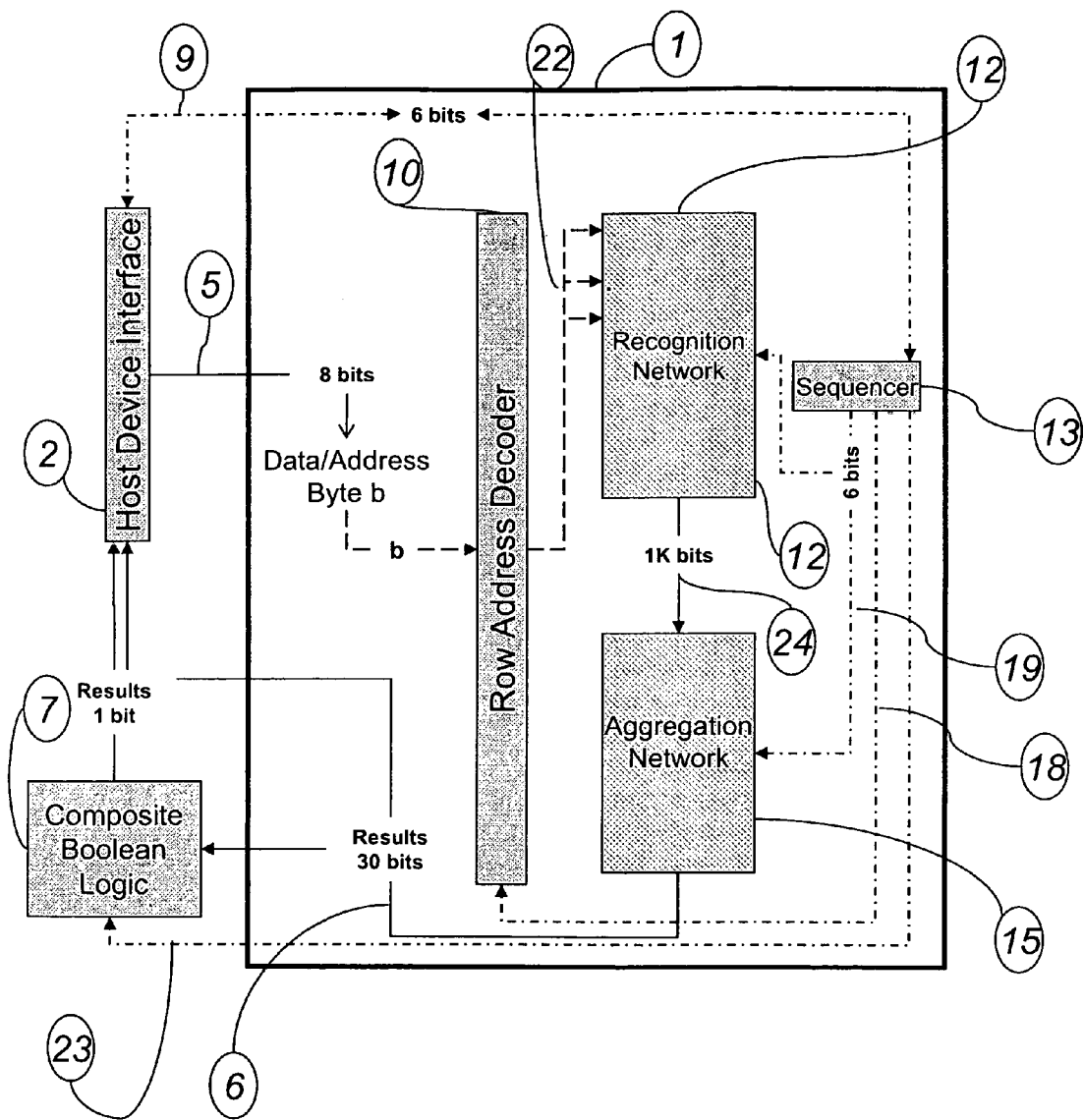
FIG. 4 is a block diagram of GPSTP alternative memory structure, Scan mode.

The second Pattern Memory structure, the Scan mode structure, is shown in FIG. 4. In Scan mode the Pattern Memory is treated as three 256 ×1024 bit partitions one 96×1024 bit partition and a 160×1024 bit partition. The detailed Scan mode Pattern Memory structure is shown in Table 1. One column of the Pattern Memory belongs to each Detection Cell. The column $PM_i$ holds all the bits that define the behavior of $DC_i$ and its relation to all the other Detection Cells.

TABLE 1

Scan Mode Pattern Memory Structure

|  | $PM_{row}$ | Symbol | Description/Name | |
|---|---|---|---|---|
| Recognition Network | 0 | S | Cell's Current State | 96 Rows |
|  | 1 | IS | Initial State |  |
|  | 32-86 (1-of-6) | SFP | Select Forward Propagation |  |
|  | 33-87 (1-of-6) | SRP | Select Reverse Propagation |  |
|  | 34-88 (1-of-6) | FPS | Forward Propagation Switch |  |
|  | 35-89 (1-of-6) | RPS | Reverse Propagation Switch |  |
|  | 36-90 (1-of-6) | AFP | Accept Forward Propagation |  |
|  | 37-91 (1-of-6) | ARP | Accept Reverse Propagation |  |
|  | 92-95 | RFU | Reserved for Future Use |  |

TABLE 1-continued

Scan Mode Pattern Memory Structure

| | $PM_{row}$ | Symbol | Description/Name | |
|---|---|---|---|---|
| Aggregation Net | 96-220 (1-of-4) | RLB | Results Latch Bits | 160 Rows |
| | 97-221 (1-of-4) | RIB | Reserved for Future Use | |
| | 98-222 (1-of-4) | LNL | Latch No Latch | |
| | 99-223 (1-of-4) | SLG | Select Logic Group Bits | |
| | 160-192(1-of-4) | RBM | Reserved for Future Use | |
| | 255 | TLIV | Threshold Logic initial values | |
| Reaction Memory | 256-511 | MA | Auto-Enable Memory | 768 Rows |
| | 512-767 | MS | Successor-Enable Memory | |
| | 768-1023 | MR | Response Memory | |

In Scan mode the three 256×1024 bit partitions are treated as three separate conventional memories accessed simultaneously with the same address, the binary value of the input byte from the scan stream. On each input byte cycle one 1024 bit row is read from each of the three memories which are accessed independently using separate sections of the Row Address Decoder so that 3×1024 bits are accessed on the same clock cycle. The remaining 96×1024 bits in the Recognition Network and the 160×1024 bits in the Aggregation Network are not used conventionally in Scan mode. The circuits that use these memory partitions access the memory bits directly, not using the bit lines by which they are accessed in the load and diagnostic modes.

Figure 5:
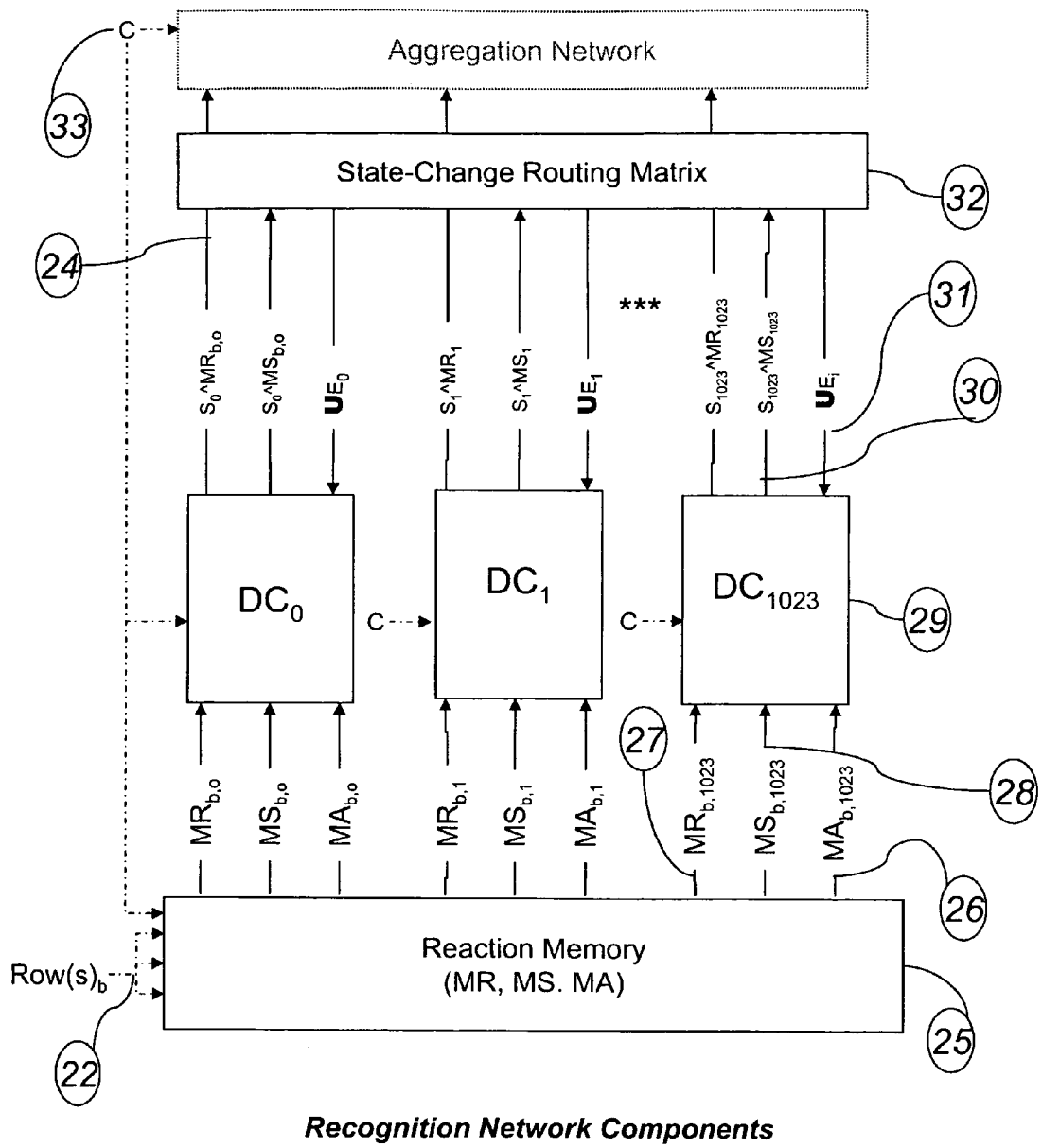
FIG. 5 is a block diagram showing Recognition Network components.
Figure 7:
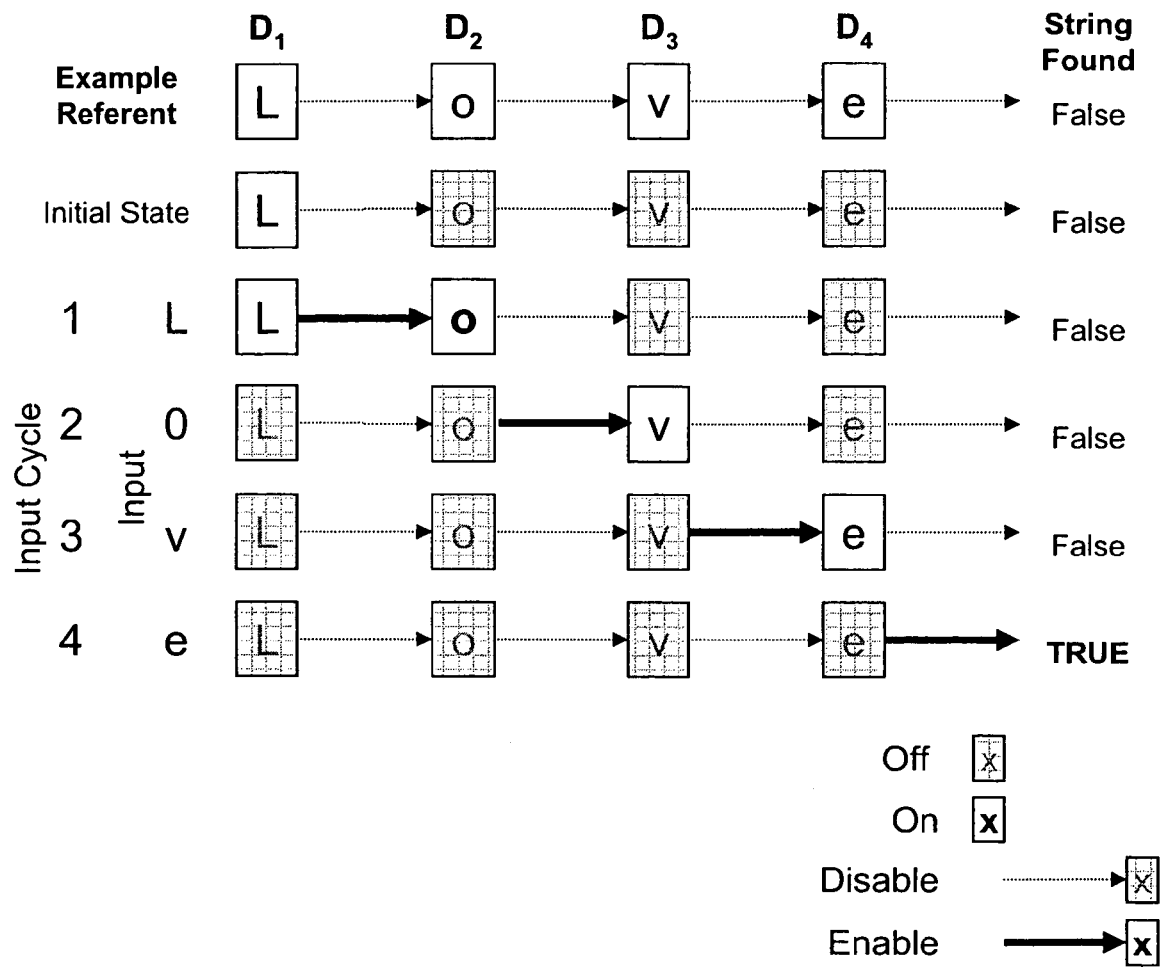
FIG. 7 is a functional diagram explaining the Detection Propagation method.

As shown in FIG. 5 the Recognition Network comprises an ordered plurality of two-state deterministic finite state automata (DFSA) called Detection Cells indicated by reference numeral 29, a Reaction Memory 25, and a State-Change Routing Matrix (SCM) 32. In Scan mode as each input byte b is presented to the GPSTP the sequencer sets Clock C 33 to "1". C is applied simultaneously to the Reaction Memory 25, to all Detection Cells 29, and to the State-Change Routing Matrix 32. This uses 1024 bits $MR_{b,0-1023}$ 27, $MA_{b,0-1023}$ 26, $MS_{b,0-1023}$ 28 each from the Response Memory, Auto-Enable, and Successor-Enable memories. This causes each Detection Cell $DC_i$ 29 to pass the values of $S_i \hat{} MR_{b,i}$ 24 to the Aggregation Network and $S_i \hat{} MS_{b,7}$ 30 to the SCM 32. The SCM returns $UE_i$ 31 (the disjunctive sum of Successor-Enable outputs of $DC_i$'s Precursors). The foregoing operations are accomplished in one clock cycle.

Detection Logic Method

To determine whether a byte in a stream satisfies a qualifying condition, this invention does not compare the byte to a stored byte value. Instead, the invention employs a method of representing qualifying conditions called counter representation. To understand counter representation consider the following:

Suppose it is desired to detect the occurrence of an uppercase letter "L". Counter representation represents the "L" using the binary value of the digital symbol $01001100_B = 76_D$ to write a 1 into a response memory (256×1 bits). FIG. 6a depicts a segment of a 256×1 bit memory. The decimal numerical column is the row number or row address of each bit. The bit value is given in the center column, and the right column is the ASCII equivalent of the binary value of the row address. And the arrow indicates the row into which a 1 is written for the counter representation of "L". To detect an "L" in a stream of bytes, it is only necessary to "read" the contents of the response memory using the binary value of each byte as an address FIG. 6b: the output of the response memory will be 0 for any value other than $76_D$ and 1 only if the value is $76_D$. Note that counter representation is independent of coding scheme; as long as the counter representation bit is written using the same coding scheme as that to be scanned. All that is necessary to change from one coding scheme to another is re-order the response memory rows according to the second scheme.

Term Logic Method

To detect patterns longer than a single byte a number of said Detection Cells can be strung together in a linear arrangement with the output of each Detection Cell connected to its immediate successor. These Detection Cells, in addition to a response memory are provided with an additional bit of memory to indicate the state ("OFF" or "ON"). In FIG. 4 the response memories of four Detection Cells, $DC_1$-$DC_4$, have been set up to detect the string "Love". Output of Detection Cell $DC_1$ is connected to the state memory (or simply state) of $DC_2$, the output of $DC_2$ to the state of $DC_3$, etc. The state $S_1$ of $DC_1$ is initialized to "ON" and all of the initial states of the other Detection Cells to "OFF".

Presenting the string "Hope and Love" to all four Detection Cells (each byte presented to all Detection Cells simultaneously), none of the Detection Cells would respond (output a 1) until the "L" is presented, at which point the output of $DC_1$ enables $DC_2$ (sets its state to "ON" by writing a 1 into its state memory). Similarly, as "o", "v", and "e" are presented the detection is propagated from one Detection Cell to the next, until detection of the whole string is indicated by the output of $DC_1$. (The preferred embodiment type of memory used for Detection Cell states allows the current contents of the memory to be read on the same clock signal as that used to write a new value, so detection propagation does not propagate prematurely.) Since it enables the Detection Cell's successor when it's value is one, this 256×1 memory is called the Successor-Enable Memory ($MS_i$) and its output for an input byte b is denoted $MS_{b,i}$. The state bit is used to control output from the Detection Cell. The Successor-Enable response of $DC_j$ for an input byte b is given by the expression (the "$\hat{}$" denotes the logical AND operator):

$$S_i \hat{} MS_{b,i}$$

Note that the output of each Detection Cell is written into its successor's state memory even if it is zero. This has the effect of placing the successor Detection Cell in the "OFF" state for the next input byte. (Again, because of the built in delay in this type of memory if a Detection Cell is "ON" when a byte is presented it will output the value at the location addressed by that byte. The state value relayed from its predecessor sets its state for the next input byte.) Detection Cells being disabled (state set to "OFF") between each bytes is a desirable, other wise, "Lark and dove" would be erroneously detected: the "L" in "Lark" enabling $DC_2$ that then picks up the detection propagation with the "o" in "Dove".

But if $DC_1$ is disabled between input bytes, the initial "L" will only be found if the first input byte is an "L". Initial Detection Cells could be treated differently from the others, but for reasons that will be apparent below treating all Detection Cells the same is highly desirable as special treatment for initial Detection Cells would diminish the generality of the device. So, a general mechanism for keeping an initial Detection Cell enabled is needed, a mechanism that can also be used to meet other requirements.

Such a mechanism can be derived from counter representation as well. If all Detection Cells are provided with an 256×2 response memory instead of 256×1, the additional bits can be used by an initial Detection Cell to keep itself enabled; thus, this 256×1 memory is called the Detection Cell's Auto-Enable Memory and is denoted $MA_i$. Like the Successor-enable Memory, its output is controlled by the Detection Cell's state $S_i$, and its Auto-Enable output is given by the expression $$S_i \char`\^ MA_{b,i}$$

A Detection Cell's Auto-Enable Memory can also be used selectively to meet other needs (such as precision wild cards and ignoring missing or extra bytes, etc., as will be addressed later.) To keep an initial Detection Cell in the "ON" state all 256 of its Auto-Enable bits are set to 1. Each input byte addresses both the Successor-Enable response and the Auto-Enable response at the same time. A Detection Cell's auto-enable bit together with its predecessor's successor-enable bit enable the Detection Cell if either is a 1. The next state of $D_i$ is given by the expression (the "v" denotes the logical OR function):

$$S_i \char`\^ MA_{b,i} \lor S_i \char`\^ MS_{b,i-1}$$

In the simple cases discussed above it is sufficient to treat the Successor-Enable output of the final Detection Cell as a reaction to the conditions expressed in all of the Detection Cells. But the objective of the present invention requires that it be able to scan the contents of a data stream for the presence of combinations of many pattern elements at once. A pattern will involve many times the number of Detection Cells discussed so far, in some cases many hundreds or thousands of Detection Cells. That is to say any final Detection Cell may be followed immediately by the initial Detection Cell for the next set. Thus, a mechanism is needed for the reaction that is separate from the Successor-Enable response and Auto-Enable memories. The response memory Detection Cell is extended to 256×3 bits. The third bit is called the Reaction bit and the third memory column, the Reaction Memory. The column is denoted $MR_i$ and the Reaction bit corresponding to byte b is denoted $MR_{b,i}$. $MR_{b,i}$=1 for Detection Cell if the byte b can be a final byte value for a string of Detection Cells. As with the Successor-Enable response and Auto-Enable memories the Detection Cell's State $S_i$ controls the Detection Cell's Reaction output that is denoted:

$$S_i \char`\^ MR_{b,i}$$

A data source input character 'b' may be an initial value for one string, a final value for another string, a sustaining value for yet another and an irrelevant character to another.

Some definitions before proceeding: A Detection Cell $D_i$ comprises a one bit State (Memory) $S_i$; a 256×3 bit Response Memory $T_i$, comprising a 256×1 Successor-Enable Memory $MA_i$, a 256×1 Auto-Enable Memory $MA_i$, and a 256×1 Reaction Memory $MR_i$; and circuits that yield outputs:

$$S_i \char`\^ MA_{b,i}, S_i \char`\^ MA_{bi}, \text{ and } S_i \char`\^ MR_{b,i},$$

and next State:

$$S_i \char`\^ MR_{b,i}.$$

The three bits $MR_{b,i}$, $MS_{b,i}$, $MA_{b,i}$, $=T_i$ is called a Reaction Triple. A Detection Cell $DC_i$ is said to be "programmed" or "configured" when its Response Memory is loaded and it's State $S_i$ is initialized. While the bit pattern that determines the Detection Cell's behavior (called a Feature) is distinct from the Cell itself, they are so intimately related that the terms will be used interchangeably in this document, except where the distinction is germane. A Simple Term is a contiguous set of Features the first of which is initialized to the "ON" state, will to remain "ON" for any input byte, and will enable its immediate successor in response to at least one input byte value; the last of which is initialized to the "OFF state, iwill remain "Off" unless enabled by its immediate predecessor, will acknowledge recognition of the Term when it is in the "ON" state in response to a term ending input byte value by sending a 1 to the Aggregation Network; and whose interior features are initialized to the "Off" state, when "ON" will detect at least one input byte value and in response enable their immediate successors, and will return to the "OFF" state unless enabled by their immediate predecessors. In less formal terms, a Term's first Feature is always alert for an input byte that begins a string of interest. It responds to such a byte by enabling its neighbor (immediate successor) for the next input byte cycle. (Now both the first and second Features are enabled.) While the second feature is "ON" it responds to an input byte in its list of satisfying bytes by enabling its neighbor for the next byte input cycle (and "going back to sleep"). This "wave" of detection is thus passed from Feature to neighbor until the Term's last Feature is enabled. If a satisfying byte is the next input, an input string satisfying the Term has been recognized and the Term's last feature sends a 1 to the Aggregation Network.

The Feature is the fundamental unit of detection and the Term is the fundamental unit of meaning. A Feature is said to detect a byte; a detected byte is said to satisfy the feature's detection criteria or to trigger its response. A string is recognized by a Term, a recognized string is said to satisfy the Term's qualifying criteria, or simply to satisfy the term.

Figure 8:
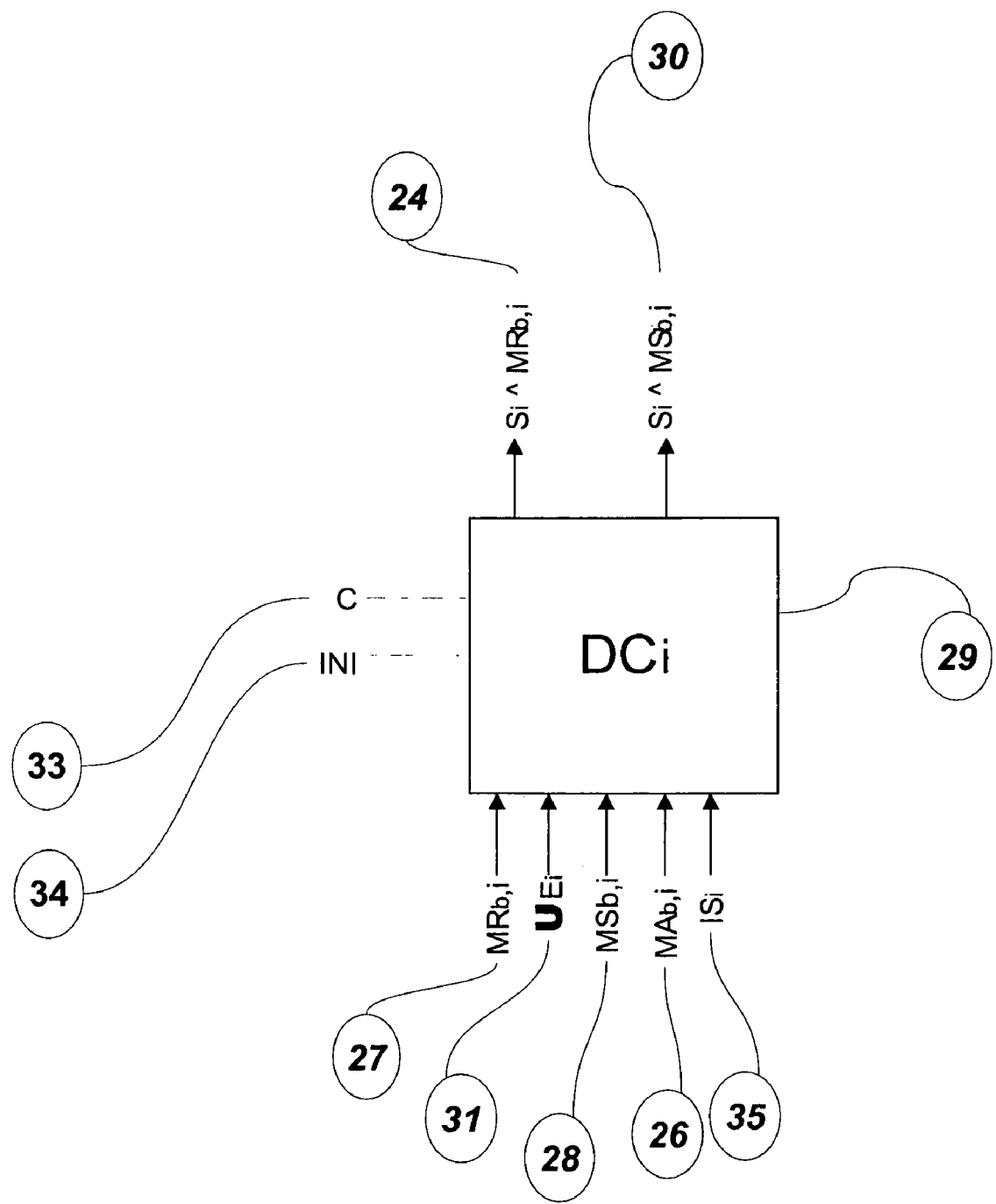
FIG. 8 is an interface diagram showing the Detection Cell formulaic description.

A formulaic description of an individual Detection Cell is shown in FIG. 8. The state $S_i$ of the Detection Cell is held in a delay flip-flop memory internal to the cell. The formulae method by which the Detection Cell operationalizes it's "ON"-"OFF" behavior. Each input symbol (byte) is used to address the Reaction Memory for Reaction Triples for all Detection Cells. For $DC_i$, indicated by reference numeral 29 the triple consists of $MR_{b,i}$, 27; $MA_{b,i}$, 26; and $MS_{b,i}$, 28. If $DC_i$ is "ON", Si=1 and so:

$$24 S_i \char`\^ MR_{b,i} = MR_{b,i}$$

$$S_i \char`\^ MA_{b,i} = MA_{b,i}$$

$$30 S_i \char`\^ MS_{b,i} = MS_{b,i}.$$

Figure 18:
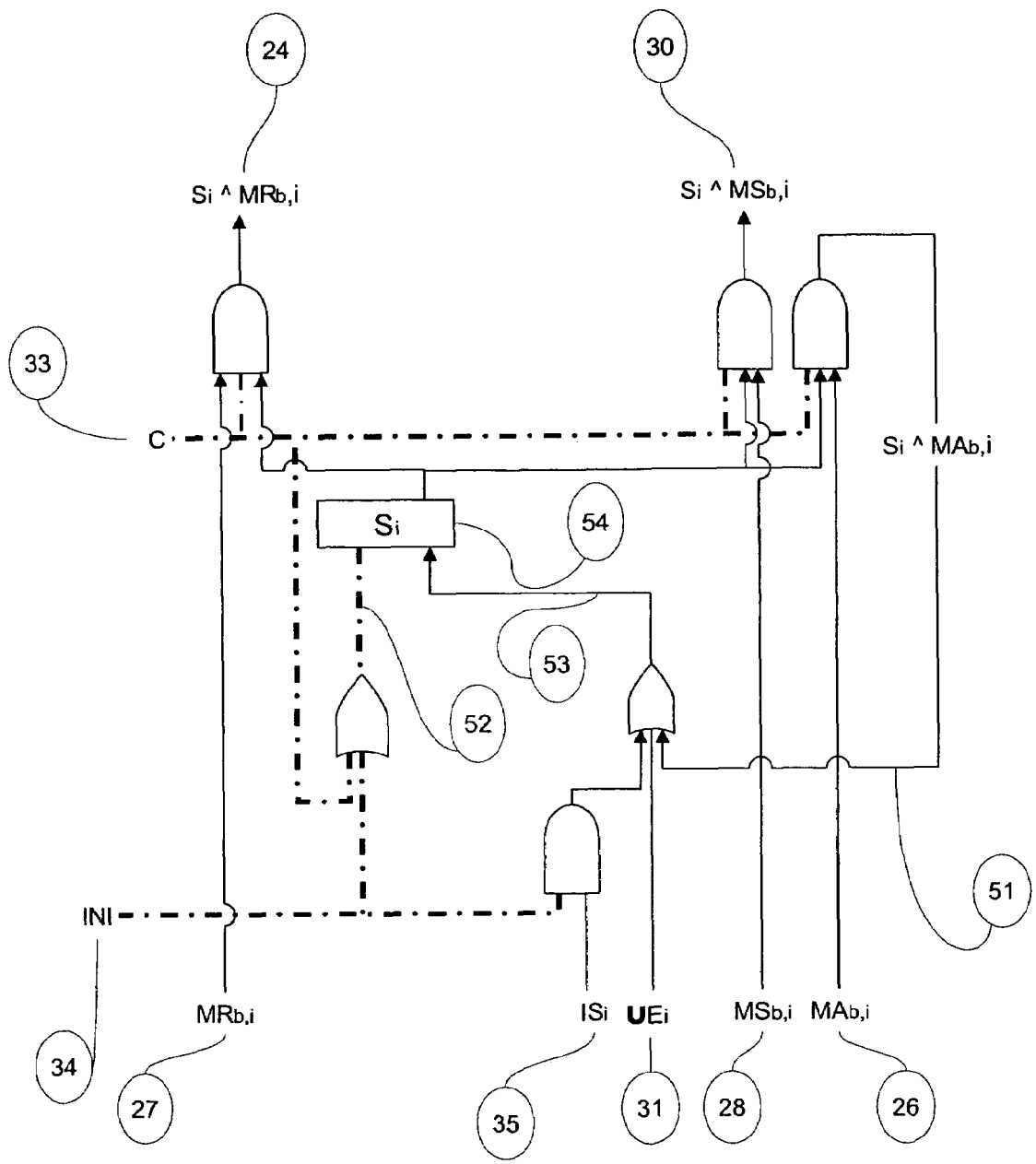
FIG. 18 is a schematic diagram of Detection Cell Detail.

($S_i \char`\^ MA_{b,i}$ is used internally and is not shown here, but will be shown in FIG. 18 as a part of the apparatus.)

If $MR_{b,i}$=1 then a Term has been recognized and the 1 is acted on by the Aggregation Network; if $MA_{b,i}$=1, then the Detection Cell is enabled for the next input byte cycle; if $MS_{b,i}=1$, the Detection Cell's successors (neighbor and other Detection Cells that may be enabled by $DC_i$) are enabled for the next byte input cycle. If the cell is "Off" $S_i=0$ and:

$S_i \char`\^ MR_{b,i}=0$ $S_i \char`\^ MA_{b,i}=0$ $S_i \char`\^ MS_{b,i}=0$.

A term has not been recognized and unless otherwise enabled the Detection Cell and its successors are set to the "OFF" state for the next byte input cycle. (This is exactly the same effect as an enabled Detection Cell for which the Reaction Triple RMb,i=(0,0,0)). This is done on a single clock cycle C 33 for all Detection Cells simultaneously, thus engaging 3×1024 bits the Reaction Memory and 1024 bits from the states of the Detection cells in the primary response to each input byte. Additional multiples of 1024 bits are engaged in secondary responses (secondary in functionality, but not in clock cycle time).

Complex Term Method

In order to recognize strings differently expressing equivalent meaning a combination of large capacity (large numbers of Detection Cells) and more complex Terms are required. Strings with the same meaning as "dog chases cat" may be expressed as "poodle pursues puma", for example. And substitutions can be made for any of the three words in the string and still produce a string that will be of interest to a person with respect to some body of text. Depending on the robustness of the user ontology there may be dozens of substitutions for each word. If each noun is varied through 12 alternatives and the verb is varied through 5, the number of different strings that might be of interest would be 770. If string variants' average length is 20, more than 14,000 Detection Cells would be required using Simple Terms. The Complex Term method used by the invention, however, reduces that number dramatically to fewer than 600.

The meaning of three words need to be clarified before proceeding; they define elements that correspond to the beginning, middle, and end of the Simple Term.

A Term Prefix is a set of contiguous Features such that for the first $DC_f$:

$MA_{b,f}=1$ for $0 \leq b \leq 255$ $MS_{b,f}=1$ for at least one $b$ $MR_{b,f}=0$ for $0 \leq b \leq 255$ And for subsequent Features $DC_i$:

$MA_{b,i}=0$ for $0 \leq b \leq 255$ $MS_{b,i}=1$ for at least one $b$ $MR_{b,i}=0$ for $0 \leq b \leq 255$.

A Term Infix is a set of contiguous Features $DC_f$ such that:

$MA_{b,i}=0$ for $0 \leq b \leq 255$ $MS_{b,i}=1$ for at least one $b$ $MR_{b,i}=0$ for $0 \leq b \leq 255$.

A Term Suffix is a set of contiguous Features such that for the first $DC_f$:

$MA_{b,i}=0$ for $0 \leq b \leq 255$ $MS_{b,i}=1$ for at least one $b$ $MR_{b,i}=0$ for $0 \leq b \leq 255$ And for that for the last $DC_L$:

$MA_{b,L}=0$ for $0 \leq b \leq 255$ $MS_{b,L}=0$ for $0 \leq b \leq 255$ $MR_{b,L}=1$ for at least one $b$.

Accordingly, a Term can be re-defined as one or more Term Prefixes Followed by One or more Term Infixes followed by one or more Term Suffixes. Simple Term omits the "or more". A Complex Term includes at least one of the three. A Complex Term, like the "dog chases cat" example can have more than one beginning, middle, and end.

Figure 9:
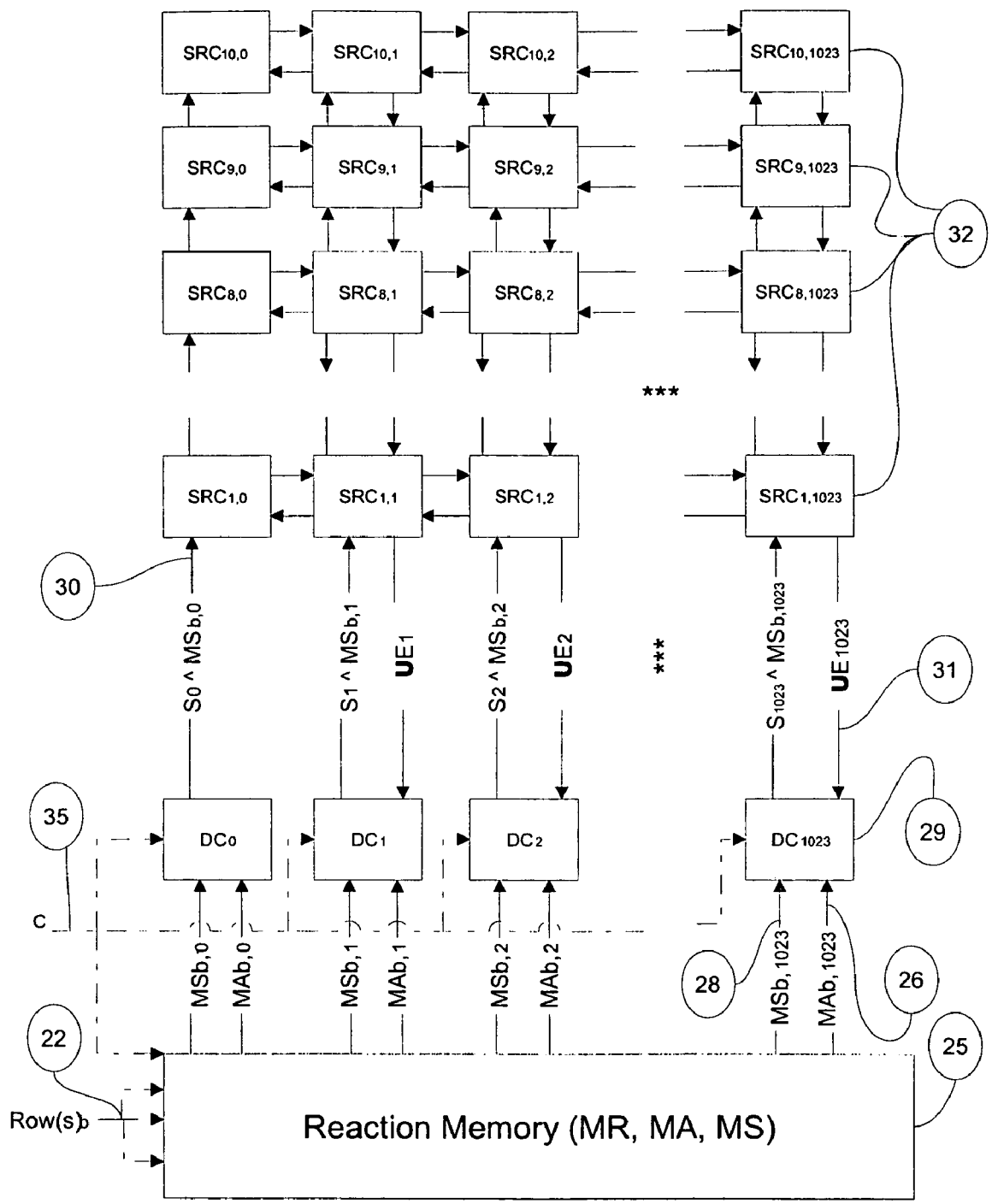
FIG. 9 is a block diagram showing the Complex Term method.

The method the invention uses to realize the Complex Term is the State-Change Routing Matrix. The State-Change Routing Matrix FIG. 9 is an ordered 2 dimensional plurality of State-Change Routing Cells (SRC's), indicated by reference numeral 32, that form a reticulum of potential interconnections between Precursor Detection Cells and Successor Detection Cells. Any Detection Cell can be a Precursor, Successor, or both. Most commonly, each Detection Cell in a Simple Term (except the last) is a Precursor of its nearest "right" neighbor and (except the first) is a Successor of its nearest "left" neighbor. The Reference Pattern determines actual interconnections from specific Precursors to specific Successors.

The $S_i \char`\^ MS_{b,i}$ 30 output of each Detection Cell $DC_i$ (as potential Precursor) is connected to each of 10 SRC's (SRC1, $_i$-SRC $1_{0,i}$) 32, this means that any enabled Detection Cell that is triggered by an input b will output a 1 to all 10 of these SRC's 32. Similarly, each column of 10 SRC's (SRC1,$_i$-SRC1 $_{0,i}$) 32 is connected by lines 31 to a Detection Cell $DC_i$ (as potential Successor). These lines carry $USE_i$, the disjunctive sum of successor enable ($S_{pi} \char`\^ MS_{b,pi}$) 30 outputs of $DC_i$'s Precursors. $USE_i=1$ whenever any of the $DC_i$'s Precursors ($S_{pi} \char`\^ MS_{b,pi}$)=1. In $DC_i$, $S_i=USE_i$ v ($S_{pi} \char`\^ MA_{b,i}$) becomes $DC_i$'s new state. This state change (for all Detection Cells) occurs on the "trailing edge" of the same clock C 33 as is generation of output to the Aggregation Network (FIG. 4, 15).

The State-Change Routing Cell 32 provides the method of connecting Term Prefixes to Term Infixes and Term Suffixes as well as from Term Infixes to Term Suffixes, thereby providing Enabling Propagation Paths from Precursor to Successor. It is a hub controlling Successor Enable signals from the Detection Cell as Precursor via Enabling Propagation Paths to Detection Cells as Successors.

Figure 10:
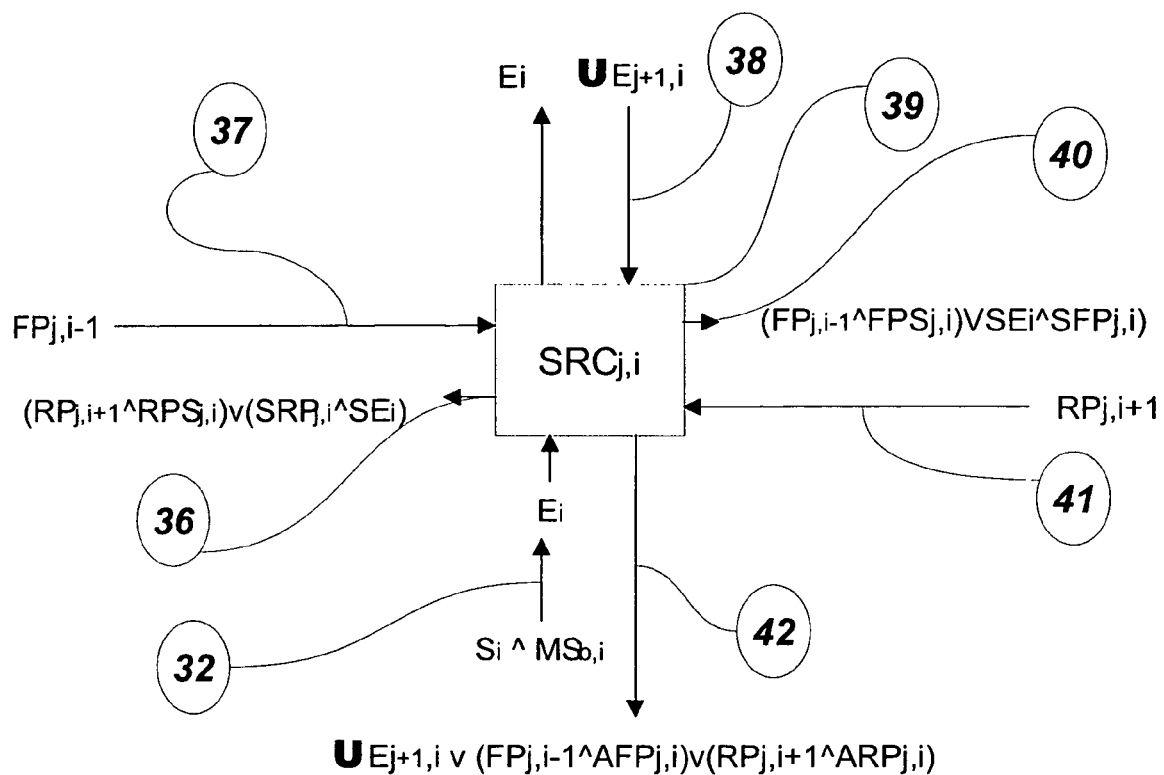
FIG. 10 is a functional diagram of the State-Change Routing Cell formulaic description.

The formulaic description of an individual State-Change Routing Cell indicated by reference numeral 39 is shown in FIG. 10. The Successor Enable input $SE_i$ ($S_i \char`\^ MS_{b,i}$) enters $SRC_j$ via line 32. If $DC_j$ is to be a Precursor, either the Select Forward Propagation (SFP) switch or the Select Reverse Propagation (SRP) switch or both are set to "ON"=1. These switches allow the Successor Enable to be passed from $SRC_{n,j}$ to $SRC_{n,i-1}$ and $SRC_{n,i+1}$ (in possible combination with signals from Forward Enabling Propagation Paths and Reverse Enabling Propagation Paths on lines $FP_{j,i-1}$ 37 and $RP_{j,i+1}$ 41. The Forward Propagation Switch ($FPS_{j,i}$) is "On" if a Forward Enabling Propagation Path from $SRC_{n,i-1}$ is to be passed to $SRC_{n,i+1}$, and "Off" if that path is to end at $DC_i$. The Reverse Propagation Switch ($RPS_{j,i}$) is similarly set to pass on or terminate a Reverse Enabling Propagation Path from $SRC_{n,i+1}$. The disjunctive combination of Successor Enable signals originating from $DC_i$ and those arriving at SRCn,i are passed to $SRC_{n,i-1}$ and $SRC_{n,i+1}$ via lines $(FP_{j,i-1}\char`^FPS_{j,i})$ v $SE_i\char`^SFP_{j,i})$ 40 and $(RP_{j,i+1}\char`^RPS_{j,i})v(SRP_{j,i}\char`^SE_i)$ 36. If $DC_i$ is to be a Successor either or both of the Accept Forward Propagation and Accept Reverse Propagation are "ON". $USE_{j+1,i}$, the Successor Enable signal accumulated from $SRC1_{0\ to\ j+1,i}$ is received via line 38. The disjunctive sum of $USE_{j+1,i}$ and those accepted from either propagation direction $USE_{j+1,i}$ v $(FPj_{i-1}\char`^AFP_{j,i})v(RP_{j,i+1}\char`^ARP_{j,i})$ 42 is passed to $SRC_{j-1,i}$ and thence from SRC $1_{,i\ to}$ $DC_i$, in the form of $USE_i$ where it is combined $USE_i$ v $(S_i\char`^MA_{b,i})$ to determine the new state of $DC_i$.

Figure 11:
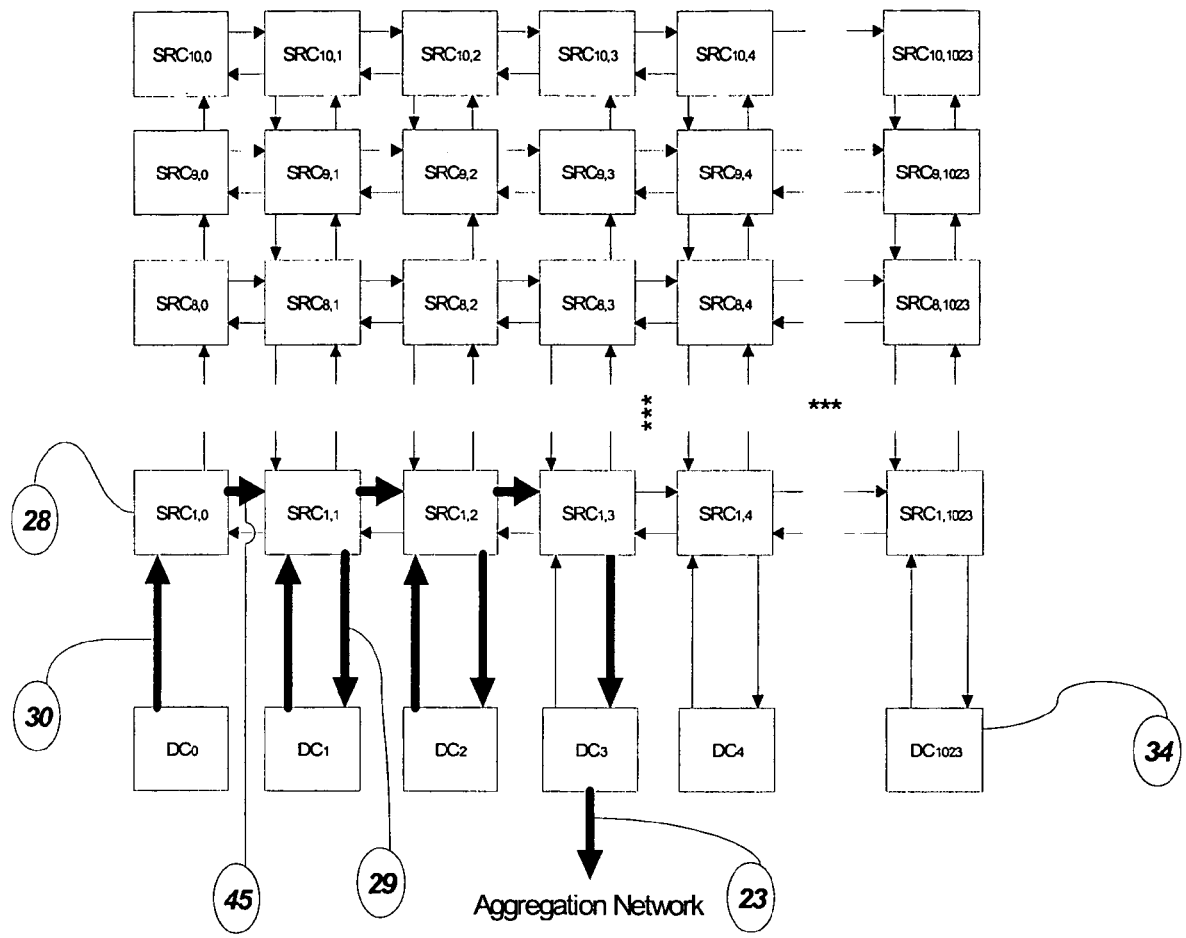
FIG. 11 is a block diagram showing the Neighbor Enable method.

FIG. 11 is a block diagram illustrating use of the State-Change Routing Matrix to provide neighbor-enabling paths, indicated by bold arrows, for a Simple Term. $DC_0$ through $DC_2$ each has at least one Successor Enable Bit set to 1, connecting Successor Enable from one Detector Cell to the next SRC via lines indicated by reference numerals 30, and 45. $SRC_{1,0}$ to $SRC_{1,3}$ are set to Select Forward Propagation lines 29, and $SRC_{1,3}$ has at least one Response bit set to 1 as indicated by line 23. These settings provide a Forward Enable Propagation Path from $DC_0$ to $DC_1$, $DC_1$ to $DC_2$, and from $DC_2$ to $DC_3$. Pass-through of Successor Enable (Forward Propagation Switch) is "OFF" in $DC_0$ through $DC_3$, so Successor Enable propagation is forced through the Detection Cells one at a time.

FIG. 12 with greatly simplified graphics shows two examples of use of the State-Change Routing Matrix. First features are indicated by heavy box borders. The drawing in FIG. 12A illustrates a single Complex Term with a single Term Prefix, three alternate Term Infixes, and a single Term Suffix. It is intended to detect any of four words that share meanings with the word "cat"; only whole words will do ("caterpillars" and "catalepsy" will not satisfy). The Term's first feature has all of its Auto-Enable bits set to 1 to keep it perpetually "ON". And all of its Successor-Enable bits whose row addresses correspond to an inter-word character (spaces, tabs, etc.) are set to 1. So every time an inter-word character is input, this first Detection Cell is triggered and outputs a 1 to the State-Change Routing Matrix. Using Enabling Propagation Paths in State-Change Routing Matrix rows 2 and 3 (Row 1, used in this case for neighbor enable only, is not shown to avoid clutter. Though an enable path to neighbors is not shown, it can be assumed) the features beginning the strings "cats", "felines", "siamese", and "tabby" are enabled for the next byte input cycle. This is an illustration of "fan out". For the next input byte five Detection Cells are "ON". If the next byte is a "c", an "f", an "s" or a "t", the detection is propagated to the Detection Cell following the triggered Detection Cell enabling it for the next byte input cycle. For this byte input cycle, two Detection Cells are "ON". Assuming that at least one of the "cat" words is encountered, the last Detection Cell in the corresponding Feature string will at some time be enabled and satisfied. Enabling Propagation Paths, indicated by the dashed line connecting the last Detection Cells of each of the four Feature strings to the feature with the capital sigma. This is an example of "fan in". For the "sigma" Detection Cell Response Bits whose row addresses correspond to the binary value of bytes that represent inter-word or punctuation characters are set to 1. If the next input byte is one of these, a 1 is output from this Detection Cell to The Aggregation Network.

FIG. 12B. Is intended to recognize members of the set of strings that begin with either the string "cat" or "lion" (not necessarily whole words) followed by the word "chase" followed by either of the words "dog" or "fido". It comprises two Term Prefixes, a single Term Infix, and two Term Suffixes. The Enabling Propagation Path from the "t" feature in the "cat" feature string to the "lower case sigma" Feature between the "lion" and "chase" feature strings allows both Term Prefixes to operate in parallel (There is no Enabling Propagation Path between the "t" Feature in the "cat" feature string and the "l" first Feature of the "lion" Feature string because having no Precursor is part of the definition of "first" Feature in a Term or Term Prefix.) The "lowercase sigma" Features have both their Auto-Enable and Successor-Enable bits set to 1 for row addresses corresponding to the binary values of bytes representing inter-word characters. This arrangement allows them to detect variable numbers of characters between words still propagate the detection "wave" to the first word character Feature in the following Feature String. Once enabled, the Auto-Enable bit settings of these Detection Cells keep them "ON" as long as they continue to receive inter-word characters and their Successor-Enable bit settings keep the next Detection Cell enabled for the next input byte cycle. So when the first word-character following an inter-word string is received, the "lowercase sigma" feature is not satisfied, but if that word-character is a "c", the "c" Feature of the "chase" Feature string is satisfied and continues the detection "wave". When the second "lowercase sigma" Feature is triggered both the "d" feature In the "dog" Feature string and the "f" Feature in the "fido" are enabled, the former by the implicit Enabling Propagation Path between Detection Cells and their "right" neighbors (when the neighbor is not the first Feature in a Term Prefix) and the later via the Enabling Propagation Path from the second "lowercase sigma" Feature. The terminal Feature in each of these Feature strings is a "capital sigma" Feature that has Response Bits whose row addresses correspond to the binary values of bytes representing inter-word or punctuation characters to set to 1 and all other bits in its Reaction Memory set to 0.

It is stressed here that phrases like "implicit Enabling Propagation Path between Detection Cells and their 'right' neighbors" refer to this explication and not to the device itself. The apparatus is completely general; its behavior is determined by the contents of its pattern memory. Responses of Detection Cells are determined by the contents of their Reaction Memories; their interaction with other Detection Cells is determined by the values of delay flip-flop memories that control switches in the State-Change Propagation Matrix (and these switch memories like all cells in the invention are part of the Pattern Memory.

Figure 13:
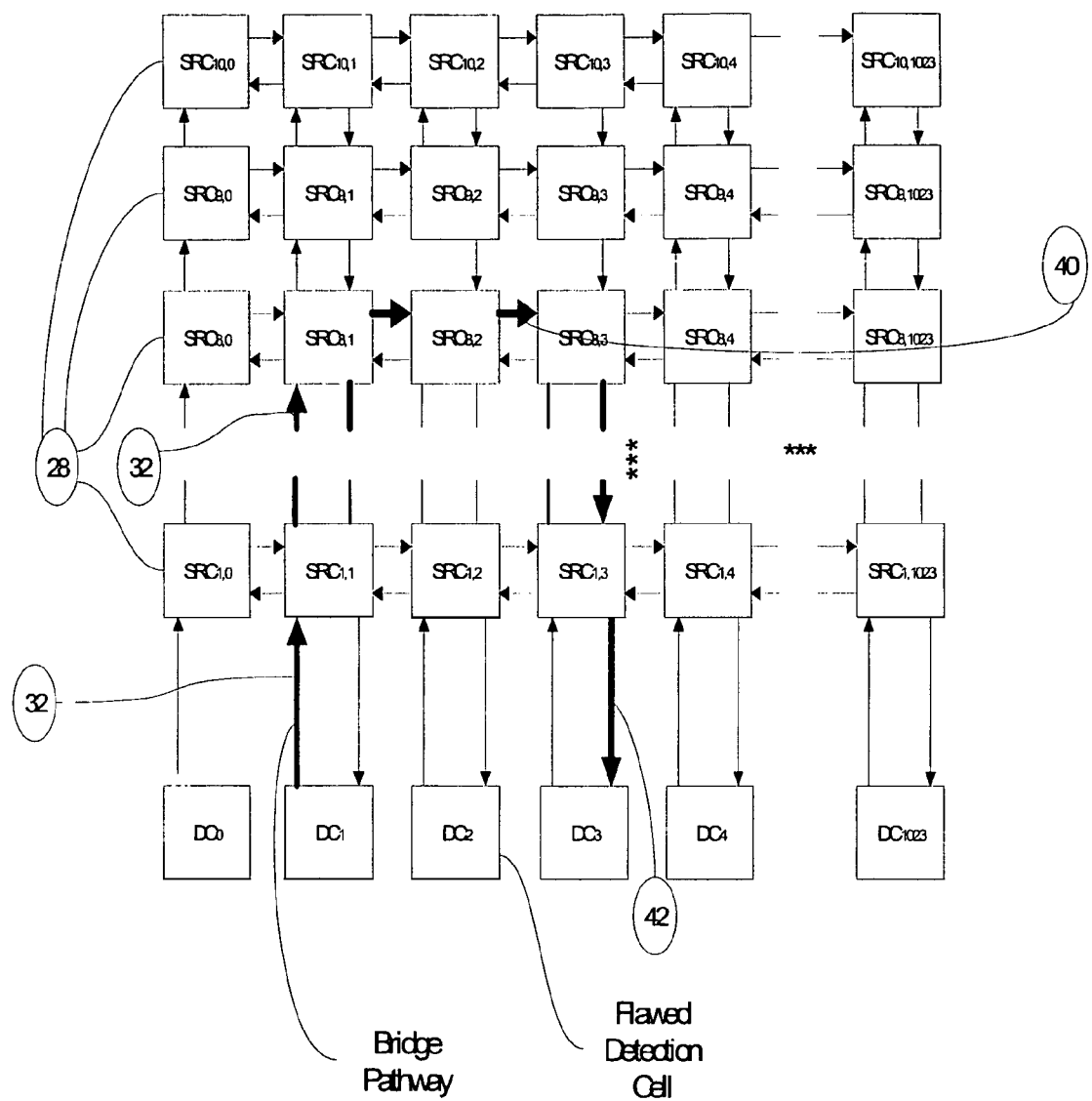
FIG. 13 is a block diagram showing the "Bridge" a Flawed Detection Column method.

One of the important benefits of the State-Change Propagation Matrix architecture is that it provides a method for tolerating manufacturing errors. The number of flaws in a semiconductor is proportional its number of gates. The more gates, the smaller the feature size, the greater the number of flaws. Flaws are a serious cost driver either in the form of reduced yield or remediation cost. But the columnar organization of the pattern memory of the invention allows chips to be used even with multiple, possibly many flaws. All of the memory (1024 bits) associated with a Detection Cell is a column of the Pattern Memory and all of the "additional" gates (those not used for reading and writing whole memory rows) associated with a Detection Cell are co-located with the Detection Cell's memory column. Each Detection Cell and its memory column is a relatively independent module. If it contains flaws and there is a means to bridge between its "left" and "right" neighbors it can be ignored. FIG. 13 illustrates the means by which the State-Change Propagation Matrix can be used to "bridge" over a bad Detection Cell by configuring an Enabling Propagation Path from the "left"

neighbor of the bad Detection to its "right" neighbor. The knowledge that a Detection Cell or any of its related memory cells is bad can be established by ordinary diagnostic routines used to test semiconductor chips and provided to the adjunct software that translates user information desires into Reference Patterns. That software routinely constructs Enabling Propagation Paths for recognizing complex string sets. It can also construct them for the purpose of "bridging" over bad Detection Cells or flaws in any part of the Pattern Memory associated with a Detection Cell. The only cases not susceptible to this means of tolerating manufacturing flaws are flaws in the Multiplexer/De-Multiplexer, flaws in multiple State-Change Routing Cells associated with a single Detection Cell, and flaws in the part of the Pattern Memory associated with the Aggregation network. Multiplexer/De-Multiplexer flaws can be addressed independently by redundancy, multiple SRC flaws to the degree that this method would be compromised are likely to be rare enough not to have a significant affect on yield, and Aggregation Network flaws can be addressed in the Aggregation Network itself.

Aggregation Method

Figure 14:
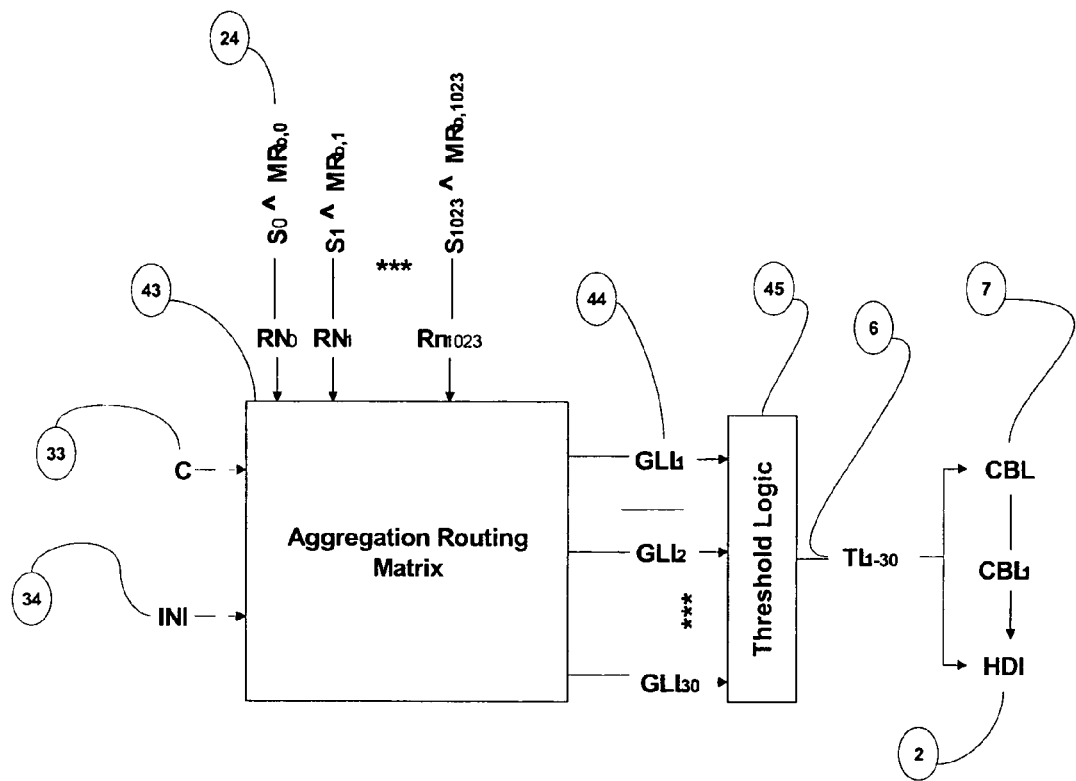
FIG. 14 is a block diagram of the Aggregation Network.

The Aggregation Network organizes term recognition results into a coherent whole. As shown in FIG. 14 it comprises an Aggregation Routing Matrix indicated by reference numeral 43, and a Threshold Logic 45. On clock C 33 each the selected response bits $S_0 \char`\^ MR_{b,0}$-$S_{1023} \char`\^ MR_{b,1023}$ 24 from the Recognition Network is routed via one or more Group Logic Lines $GLL_1$-$GLL_{30}$ 44 to the Threshold Logic 45.

Aggregation Routing Matrix

Figure 15:
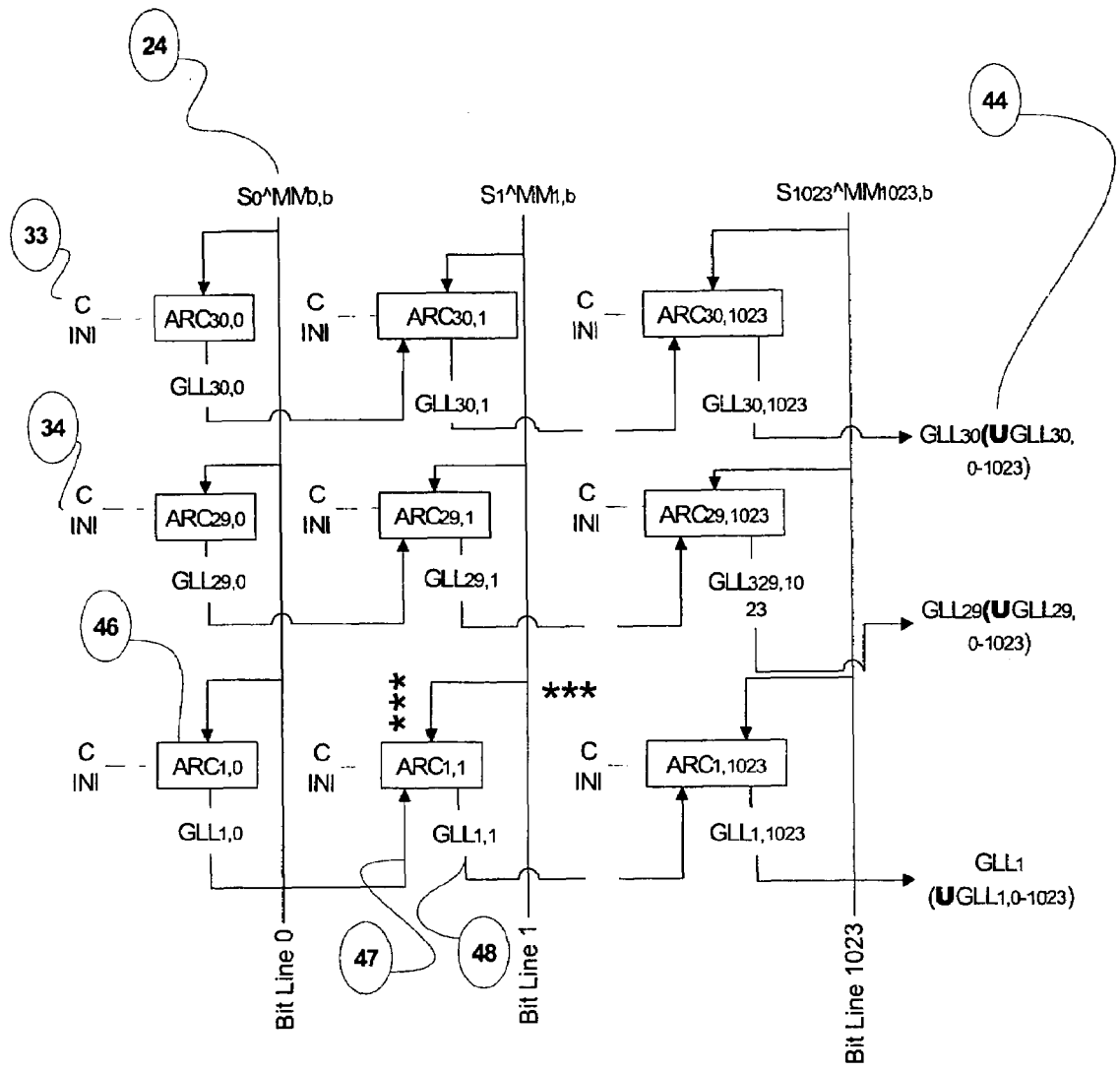
FIG. 15 is a block diagram showing the Aggregation Routing Matrix.
Figure 16:
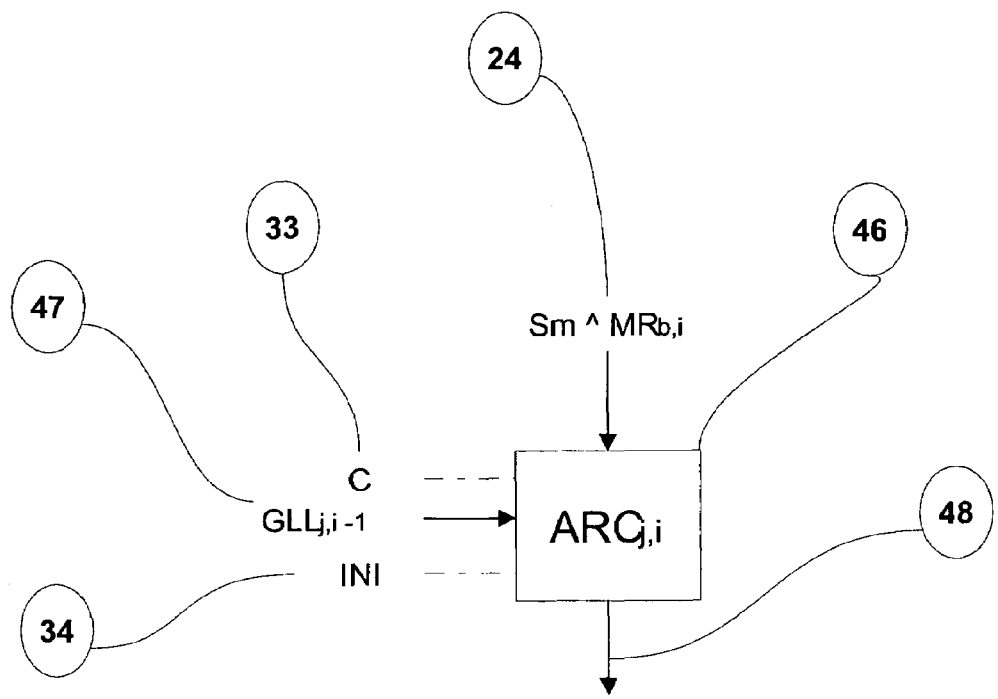
FIG. 16 is an interface diagram of the Aggregation Routing Cell Formulaic Description.

The Aggregation Routing Matrix as shown in FIG. 15, comprises an ordered two-dimensional plurality of Aggregation Routing Cells (ARC) as indicated by reference numeral 46. There is one ARC for each $S_i \char`\^ MR_{b,i}$—$GLL_j$ pair, denoted $ARC_{j,i}$ 46. The subscripts "j" and "i" also denote the row and column where $ARC_{j,i}$ 46 is located. The output $GLL_{j,i}$, 47 from each $ARC_{j,i}$ is denoted with the same subscript. On clock C 33 each $S_i \char`\^ MR_{b,i}$ 24 is input independently to each ARC with the same column subscript and the output of each as shown in FIG. 16 is given by:

$$GLL_{j,i} = GLL_{j,i-1} \vee [(Sm \char`\^ MR_{b,i}) \char`\^ (\sim RLB_{j,i} \vee LNL_{j,i}) \char`\^ SLG_{j,i})]$$

where RLB is the Result Latch Bit, LNL is the Latch-No-Latch bit, and SLG is the Select Logic Group bit. In Load mode SLG is initialized to 1 to direct output from DCi to GLLj, otherwise it is set to 0. The value of SLG does not change in Scan Mode. RLB is set to the complement of SLG in Load Mode. It can also be initialized to the value of SLG by the Host via the INI command. LNL is set to 0 in Load mode if the ARC is to act as a latch and 1 if it is not. The value of LNL does not change in Scan mode. If $SLG_{j,i}=0$, then the connection is not "selected" and $GLL_{j,i}=0$ without regard to outputs from $DC_i$ or RLB and LNL settings. If $SLG_{j,i}=1$, then RLB is initialized to Zero. With these initial settings, the first time $Sm \char`\^ MR_{b,i}=1$, $GLL_{j,i}=1$ and 44 $GLLj=\cup GLLji$ ($0 \leq i \leq 1023$)=1; and $RLB_{j,i}$ changes from 0 to 1; this has the effecting of "latching" $ARC_{j,i}$ to 0 for future input cycles (until $RLB_{j,i}$ is reset to 0). LNL=0 is used for those cases in which it is desirable to acknowledge the occurrence of a string satisfying a Term only once in a given context rather than acknowledging it on every time the Term is satisfied. These are cases where it is of interest to know that n different Terms are satisfied as opposed to knowing that a Term is satisfied n times. LNL provides for the latter, however. If LNL is set to 1, every occurrence of a string satisfying the Term whose last Feature is $DC_i$ will place a 1 on line $GLL_{j,i}$. As indicated on FIG. 15 by reference numeral 44 $GLL_j = \cup GLL_{j,i}$ ($0 \leq i \leq 1023$). That is, whenever any of the $GLL_{j,i}=1$ then $GLL_j=1$. Informally, a GLL has a value of 1 whenever any of the Terms for which it is selected is satisfied.

Threshold Logic Method

Figure 17:
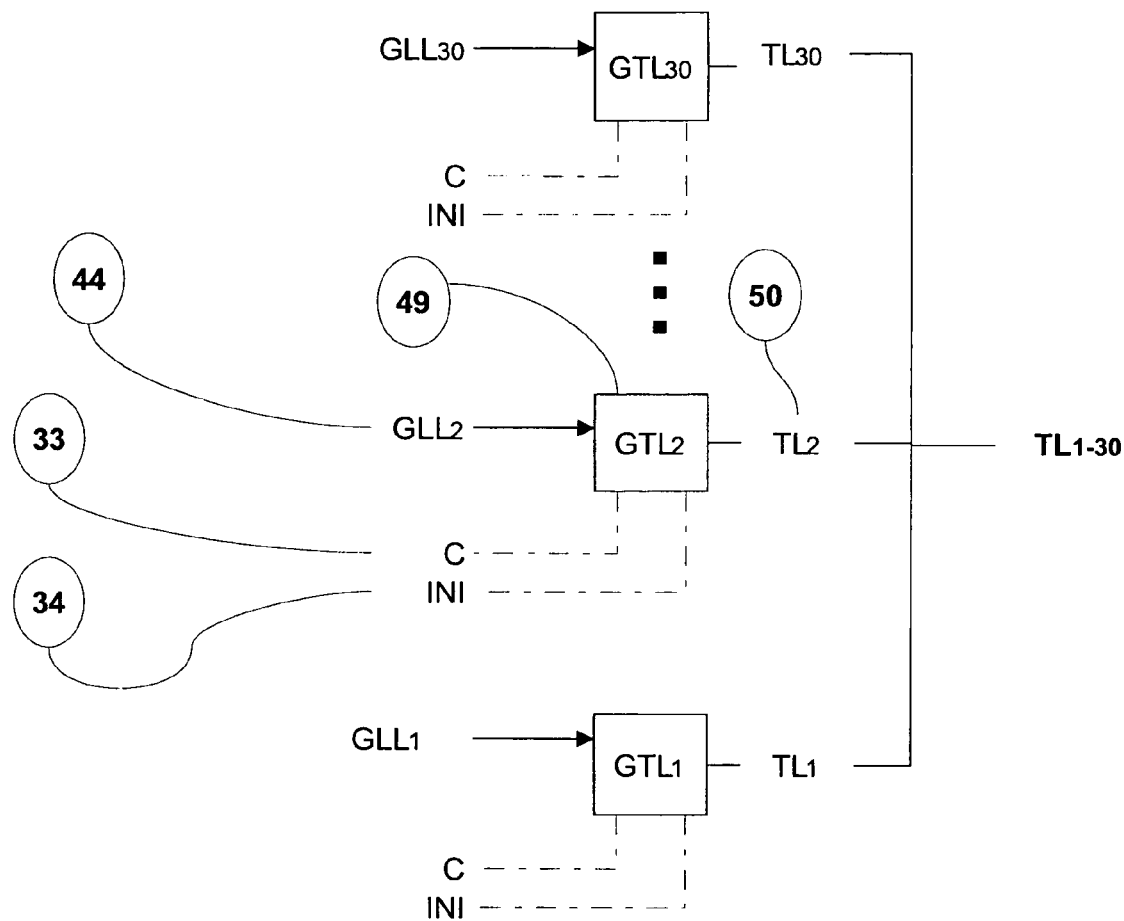
FIG. 17 is a block diagram of the Threshold Logic.

As shown in FIG. 17 the Threshold Logic comprises an ordered plurality of identical Group Threshold Logic cells (GTLs) indicated by reference numeral 49. In Load mode, a threshold value is written to each GTL 49. In Scan mode each time a GTL 49 receives 1 from its GLL 44, the threshold value in decremented by one. While the threshold value is greater than zero the GTL's output 50 TL is zero. When the threshold value is decremented to zero, GTL's output 50 TL is 1 and remains 1 until the GTL's 49 threshold is reset to the initial threshold value. (There is a 10 bit memory for the initial threshold value in each GTL 49 so it can be reset—via the INI 34 line—without reloading it from the Host).

Interpretation of the threshold differs depending on the value of the LNL. If LNL=0 then the threshold has logic meaning, of LNL=1, the meaning is numeric. If, for example the results of ten Terms are routed to the same GTL, and its threshold is 6, the meaning of its output is the truth value of "Six of these ten terms are present." If TL=0, "Six of these ten terms are present." is false. If TL=1, "Six of these ten terms are present." is true. If the threshold is 1, the meaning of the TL value is equivalent to a disjunctive sum over the scan outcomes of the ten Terms, TL=1 means "At least one of the ten Terms is satisfied." If the threshold is 10, it has the meaning of the conjunctive sum over the scan outcomes of the ten terms, that is, "All of the Terms are satisfied."

If an individual Term routed to a GTL has its LNL=1 and the GTL has a threshold of n, the meaning of the TL is the truth value of "This Term has been satisfied at least n times".

Boolean Logic

Up to thirty Threshold Logic binary digits are output to the Host (via the Host Device Interface). For many applications it may be adequate to have the Host dispose of the 30 bit result unaided. However, it may also be useful, especially with regard to performance to reduce the 30 bit result to a single yes/no one bit result, to determine whether the subject digital object "is in the set of items of interest" or not. This can be done with the use of a 1 GB random access memory. In preparing the Reference Pattern, the Host also processes a Boolean logic expression provided by the user and the user's software. If n GTL's are used the expression will have n logic variables. By assigning each of the logic variables to a binary digit in an digit binary variable and by incrementing the binary variable fro 0 to $2^n-1$, all combinations of truth values of the logic variables can be generated. Evaluating expression for every combination produces all of the possible truth valuations of the expression. Using the numerical value of the n-bit binary variable for each combination as an address the 1-bit truth value for that combination can be stored in the random access memory. Then in Scan mode the output of the Threshold Logic is presented to the address lines of the random access memory to read the pre-calculated truth value for that combination of TL values.

Apparatus

The foregoing discussion has been primarily directed at the method of the invention. The following describes more details of the apparatus that are pertinent to achieving the high throughput and low cost.

Detection Cell Detail

Details of the Detection Cell are shown in FIG. 18. $S_i$, indicated by reference numeral 54 is a delay type flip-flop memory whose current value is the state of the Detection Cell. Clock C Enables the three Reaction Memories to read a 1024 bit word from each from the row address determined by the current byte b from the input stream. This read presents values for $MR_{b,i}$ 27, $MS_{b,i}$ 28, and $MA_{b,i}$ 26, to the $DC_i$. The same C 33, on its leading edge, enables $S_i\hat{\,}MR_{b,i}$ 27 to be output to the Aggregation Network and $S_i\hat{\,}MS_{b,i}$ 30 to be output to the State-Change Routing Matrix, that systolicly returns $\cup E_i$ 31, the Disjunctive sum of $DC_i$'s Precursors' Successor-Enable outputs. On its trailing edge, C 33 enables $\cup E_i \vee (S_i\hat{\,}MA_{b,i})$ 54 to be written into $S_i$, updating $DC_i$'s state.

State-Change Routing Cell Detail

Figure 19:
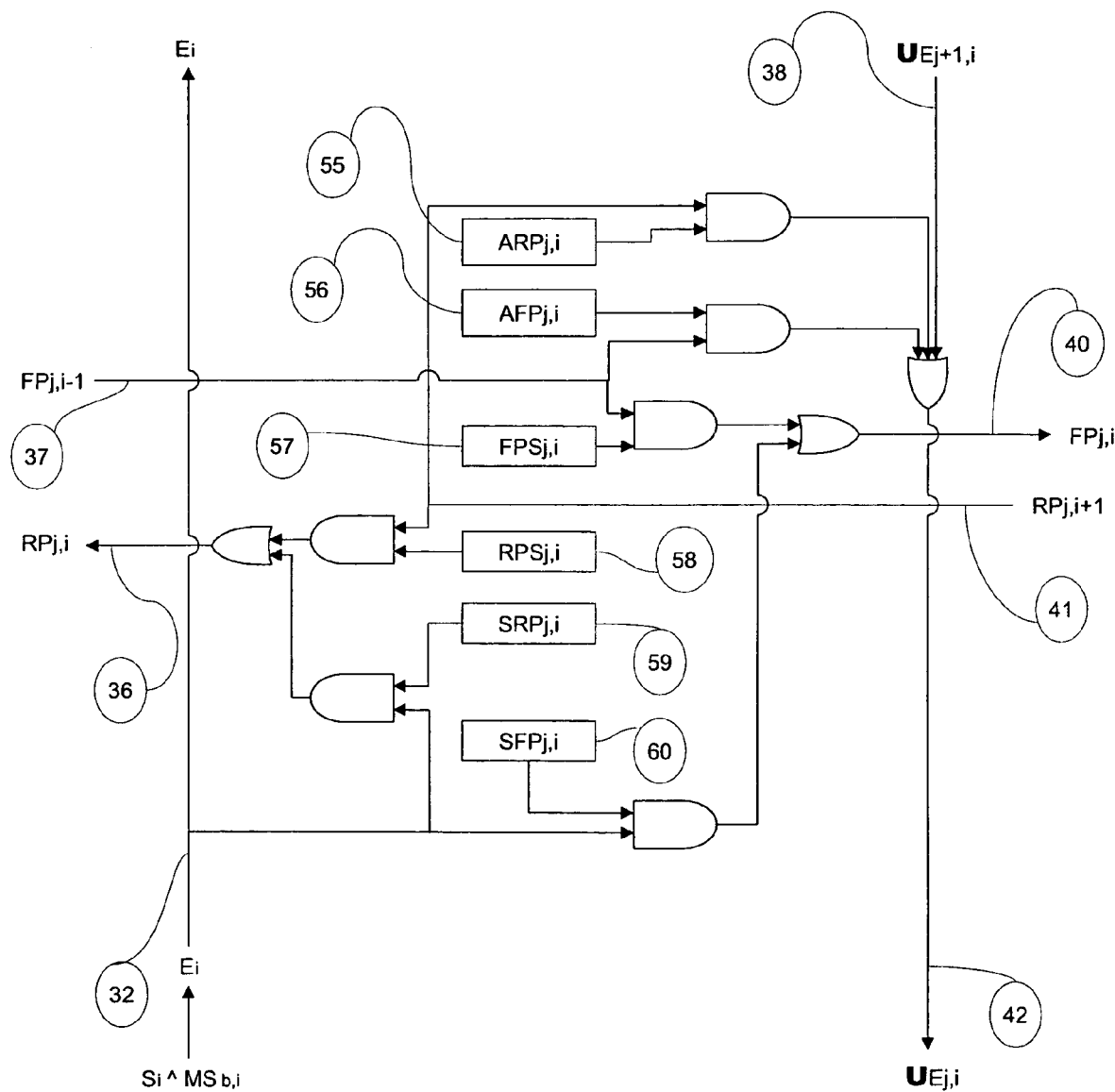
FIG. 19 is a schematic diagram of State-Change Routing Cell Detail.

As shown in FIG. 19 the State-Change Routing Cell comprises six switches, each consisting of a delay type flip-flop memory and an "AND" gate. The Select Forward Propagation bit ($SFP_{j,i}$) indicated by reference numeral 60) and its "And" gate control entry of $DC_i$'s Successor-Enable signal $E_i=S_i\hat{\,}MS_{b,i}$ 32 to the Forward Propagation line $FP_{j,i}$. The Select Reverse Propagation bit ($SRP_{j,i}$ 59) and its "And" gate control entry of $DC_i$'s Successor-Enable signal $E_i$ 32 to the Reverse Propagation line $RP_{j,i}$. The Reverse Propagation Switch ($RPS_{j,i}$ 58) and its "And" gate control passage of the Precursor Successors-Enable signals from Reverse Propagation line $RP_{j,i+1}$ 41 to Reverse Propagation line $RP_{j,i}$ 36. The Forward Propagation Switch ($FPS_{j,i}$ 57) and its "And" gate control passage of the signals from Forward Propagation line $FP_{j,i-1}$ 37 to Forward Propagation line $FP_{j,i}$ 40. The Accept Forward Propagation bit ($AFP_{j,i}$ 56) and its "And" gate control acceptance of the signal from Forward Propagation line $FP_{j,i-1}$ 37 to the disjunctive sum of Successor-Enable signals line $\cup E_{j,i}$ 42. The Accept Reverse Propagation bit ($ARP_{j,i}$ 55) and its "And" gate control acceptance of the signal from Reverse Propagation line $RP_{j,i+1}$ 41 to the disjunctive sum of Successor-Enable signals line $\cup E_{j,i}$ 42.

The values of all six of these memory cells are written in the Load mode and do not change in the Scan Mode. The State-Change Routing Matrix is static, though the traffic over it is dynamic.

Aggregation Routing Cell Detail

Figure 20:
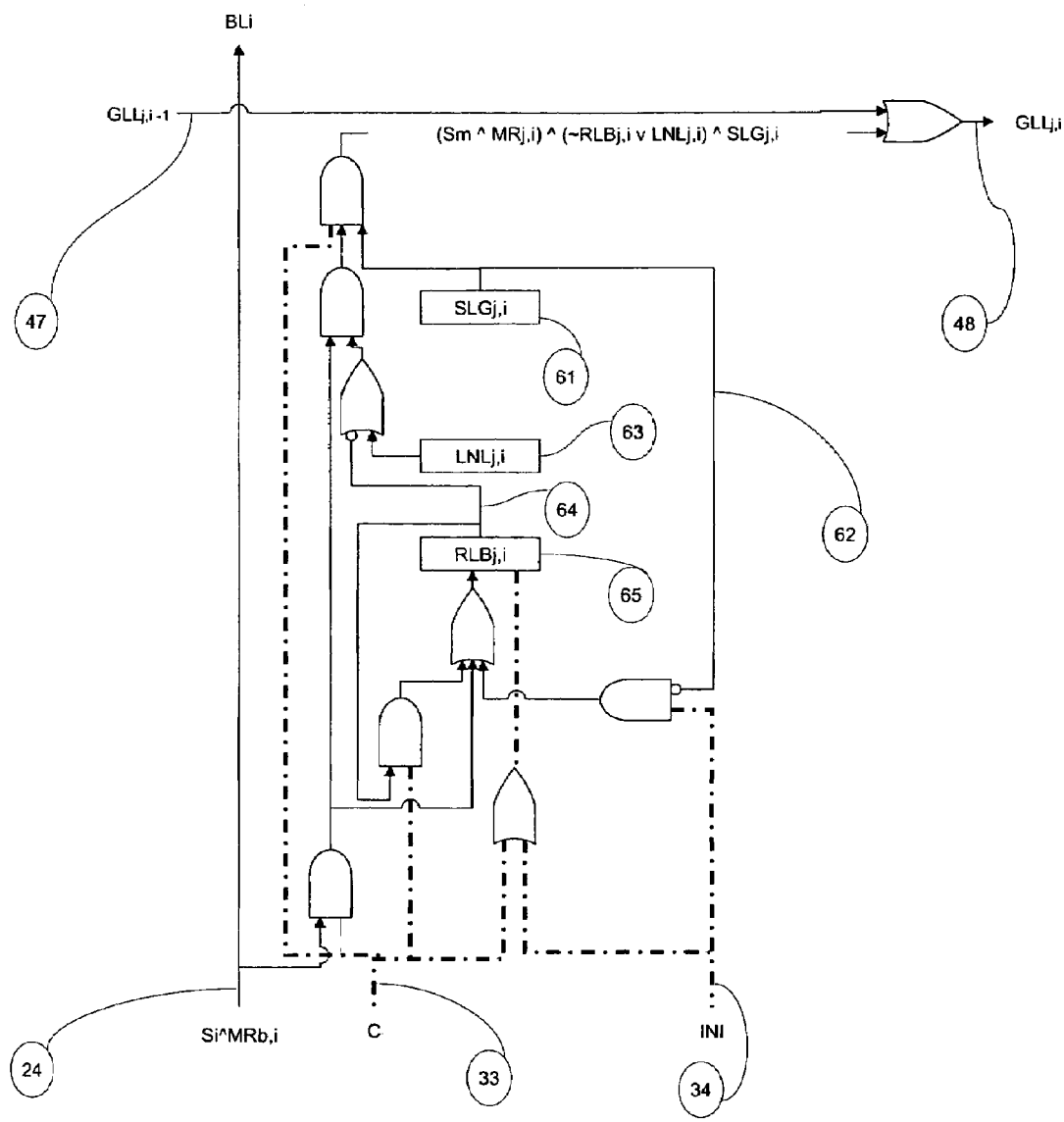
FIG. 20 is a schematic diagram of Aggregation Routing Cell Detail.

The Aggregation Routing Cell, $ARC_{j,i}$, shown in FIG. 20 is responsible for routing the output of Detection Cell $DC_i$, $S_i\hat{\,}MR_{b,i}$, indicated by reference numeral 24, to Group threshold Logic $GTL_j$ via Group Logic Line $GLL_j$ 48. The subscripts "j" and "i" also denote the row and column location of the cell in the Aggregation Routing Matrix. The output $GLL_{j,i}$ 48 from $ARC_{j,i}$ is denoted with the same subscript. On clock C 35 each $S_i\hat{\,}MR_{b,i}$ is input independently to each ARC with the same column subscript. The output $GLL_{j,i}$ 48 is given by:

$$GLL_{j,i}=GLL_{j,i}-\vee [(S_i\hat{\,}MR_{b,i})\hat{\,}(\sim RLB_{j,i}\vee LNL_{j,i})\hat{\,}SLG_{j,i})]$$

where RLB is the Result Latch Bit, LNL is the Latch-No-Latch bit, and SLG is the Select Logic Group bit. In Load mode SLG is initialized to 1 to direct output from $DC_i$ to $GTL_j$, otherwise it is set to 0. The value of SLG does not change in Scan Mode. RLB is set to the complement of SLG in Load mode. It can also be initialized to the value of SLG by the Host via the INI command (between contexts—documents, images, routing packets, etc,). LNL is set to 0 in Load mode if the ARC is to act as a latch and 1 if it is not. The value of LNL does not change in Scan mode. If $SLG_{j,i}=0$, then the connection is not "selected" and $GLL_{j,i}=0$ without regard to outputs from $DC_i$ or RLB and LNL settings. If $SLG_{j,i}=1$, then RLB is initialized to Zero. With these initial settings, the first time $S_i\hat{\,}MR_{b,i}=1$, $GLL_{j,i}=1$. And $RLB_{j,i}$ changes from 0 to 1; this has the effect of "latching" $ARC_{j,i}$ to 0 for future input cycles (until $RLB_{j,i}$ is reset to 0). LNL=0 is used for those cases in which it is desirable to acknowledge the occurrence of a string satisfying a Term only once in a given context rather than acknowledging it on every time the Term is satisfied. These are cases where it is of interest to know that n different Terms are satisfied as opposed to knowing that a Term is satisfied n times. LNL=1 provides for the latter, however. If LNL is set to 1, every occurrence of a string satisfying the Term whose last Feature is $DC_i$ will place a 1 on line $GLL_{j,i}$.

Group Threshold Logic Cell Detail

Figure 21:
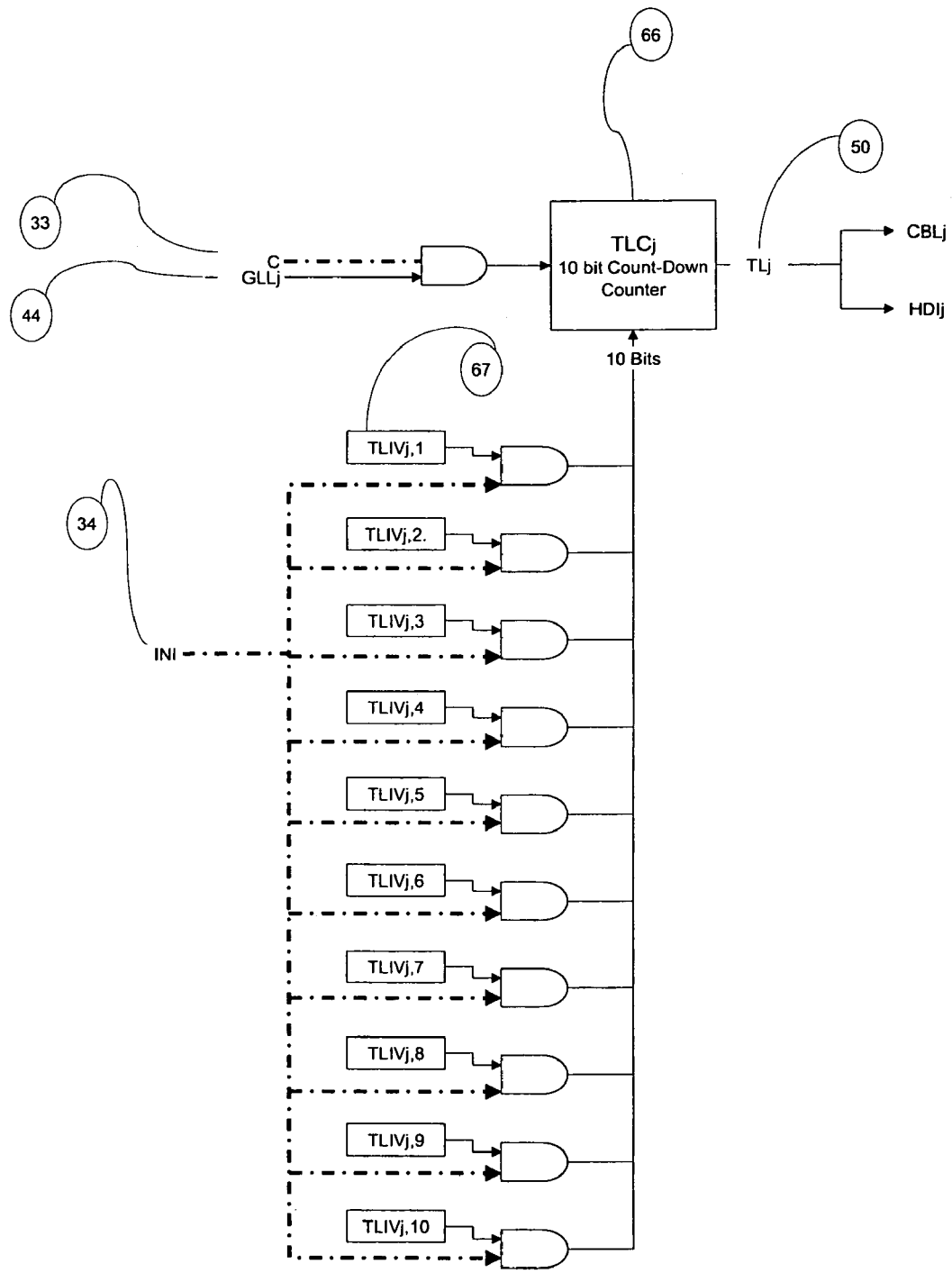
FIG. 21 is a schematic diagram of Group Threshold Logic Detail.

The Group Threshold Logic $GTL_j$ shown in FIG. 21 is one of an ordered plurality of identical Group Threshold Logic cells. In Load mode, a threshold value is written to each GTL. In Scan mode each time $GTL_j$ receives 1 from $GLL_j$ 44, its value in decremented by one. While its value is greater than zero the $GTL_j$'s output 50 $TL_j$ is zero. When the value is decremented to zero, $GTL_j$'s output 50 TL is 1 and remains 1 (until it is reset to the initial threshold value. (There is a 10 bit memory for the initial threshold value in each GTL so it can be reset—via the INI 34 line—without reloading it from the Host).

Interpretation of $GTL_j$'s threshold differs depending on the value of the LNL setting of $ALC_{j,i}$ ($0 \leq i \leq 1023$). If the LNL's=0 then the meaning is logical; if LNL=1, the meaning is numeric. If, for example the results of ten Terms are routed to the same GTL, and its threshold is 6, the meaning of its output is the truth value of the first order logic proposition "Six of these ten terms are present." If TL=0, the truth value of the proposition "Six of these ten terms are present." is false. If TL=1, the truth value of the proposition "Six of these ten terms are present." is true. If the threshold is 1, the meaning of the TL value is equivalent to a disjunctive sum over the scan outcomes of the ten Terms, TL=1 means "At least one of the ten Terms is satisfied." If the threshold is 10, it has the meaning of the conjunctive sum over the scan outcomes of the ten terms, that is, "All of the Terms are satisfied."

If an individual Term routed to a GTL has its LNL=1 and the GTL has a threshold of n, the meaning of the TL is the truth value of "This Term has been satisfied at least n times".

INDUSTRIAL APPLICABILITY

The invention is further illustrated by the following non-limiting examples:

1. Cybersecurity malware recognition—requires user-adjustable acuity, high throughput and about $1000 per unit cost declining to $10 per unit. Variety of malware signatures and diversity of threat scenarios demands reference patterns of 1000 features or greater.
2. Medical Therapy Design—GPSTX throughput and acuity will enable finding patterns in DNA and associating them with patterns of diseases, then with individual patient uptake profiles to determine treatment protocols.
3. Terabyte scale Content Monitoring as in, e.g., patent application examination or copyright infringement detection will become economically attractive given GPSTX's profile of acuity, throughput and cost.
4. Reusable Intellectual Assets—During design of systems and products reusing existing, proven components saves time and money and reduces introduction of errors. This has been well known for decades but little practiced because locating suitable reusable components is difficult. Typically any reusable object has a critical mass of a dozen or more attributes many of which are expressed in a lexicon different than the current designer is using. Locating the few reusable objects in the milieu of potentially reusable objects is the main challenge. The equivalence class capability of the device described herein can solve this problem.

5. Object oriented software accelerator—Computer software is increasingly object-based because of the several advantages of object technology. One disadvantage is that any one object broadcasts messages that may be pertinent to any number of (unpredictable) other objects. Present technology employs sequential search to identify correspondent objects. When upwards of 106 are active and each may emanate 102 to 10**4 messages per second the search for correspondents can become the limiting factor in system performance. With a GPSTX co-processor as described herein, the system execution time could be reduced up to 10×.

6. Legal—beyond improving case law text search the device enables the synthesis and analysis of scenarios in the discovery and trial phases of litigation.

7. Business Intelligence and Military Intelligence depends on high acuity recognition of factoids and situations. Further, fusion of many seemingly disparate findings has been a key problem that can now be solved with the equivalence class capability of GPSTX.

8. Semantic Net Equivalence Brokerage.

9. Text search—Device can be used not only to locate characters, strings, partial strings but also to locate contextual sets such as sentences, paragraphs, sections, chapters, documents, etc. relevant to a given issue and only those. To locate all documents relevant to a given issue and only those documents. Useful as Desktop, Workgroup Server, Enterprise portal, ISP and Federated configurations.

10. Question Answering—current mode of FAQ can be enhanced by improving content and structure of reference patterns through, for example, interactive solicitation of user disambiguation.

11. Image, audio and steganography recognition

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. For use in support of a host device through a host device interface, a general purpose set theoretic processor comprising: a pattern memory including a reaction memory unit for receiving source data from said host device and outputting a potential response based on the source data in accordance with a stored pattern;
  a recognition network for receiving the potential response from the pattern memory and transforming the potential response into an output response comprising:
    a state-change routing matrix unit; and
    an ordered plurality of detection cells;
  an aggregation network for receiving and processing the output data comprising:
    an aggregation routing matrix; and
    a threshold logic unit for generating transformed data from the output response data;
  a local clock and sequencer coupled to said pattern memory, said recognition network and said aggregation network for synchronizing and propagating said source data, said potential response, said output response and said transformed data; and
  a data transfer unit for exchanging the source data and the transformed data between said aggregation network and said host device interface.

2. The processor of claim 1 wherein said processor is configured to operate in modes of operation comprising:
  load mode;
  scan mode; and
  test and diagnostic mode.

3. The processor of claim 1 wherein said state-change routing matrix is configured to provide a reticulum of potential connections from any asset of source detection cells to any set of successor detection cells.

4. The processor of claim 3 wherein said pattern memory is configured to provide a reference pattern that establishes actual pathways through the state-change routing matrix.

5. The processor of claim 1 wherein the plurality of detection cells comprises at least 1024 data storage cells.

6. The processor of claim 5 wherein each said detection cell is associated with one column of memory cells in the pattern memory.

7. The processor of claim 5 wherein each said detection cell and its associated columns of pattern memory and state-change cells form a machine having two states and wherein said two-state machines taken together comprise a finite state machine having at least $2^{1024}$ states.

8. The processor of claim 5 wherein said pattern memory is configured so that the potential response for each said detection cell to any given input value is specified by the contents of the reaction memory and whose output response is determined by the corresponding detection cell's current state acting on its potential response.

9. The processor of claim 1 wherein said pattern memory is configured to be conventionally addressed in load mode and test and diagnostic mode with one word of at least 1024 bits being written to or read from a multiplexer/de-multiplexer at a time; and in scan mode four words of at least 1024 bits each are accessed in parallel to generate in parallel two results words (detection cell response and next state) of at least 1024 bits each.

10. The processor of claim 1 wherein said processor is configured so that said potential response and output response for all said detection cells are determined simultaneously, in parallel.

11. The processor of claim 1 wherein said threshold logic comprises a plurality of group threshold logic cells.

12. The processor of claim 11 wherein said aggregation routing matrix is configured to provide potential connections between each said detection cell and each group threshold logic cell.

13. The processor of claim 11 wherein said pattern memory is configured to store a reference pattern that establishes actual connections between detection cells and group threshold logic cells.

14. The processor of claim 11 wherein said pattern memory is configured to store a reference pattern that determines whether an output to a group threshold logic cell from at least one of said plurality of detection cells is discontinued after a first occurrence of said output response with a TRUE value, from said detection cell.

15. The processor of claim 11 wherein said processor is configured to initialize said group threshold logic cells at the beginning of a scan mode operation.

16. The processor of claim 11 wherein each said group threshold logic cell has a 1 bit output.

17. The processor of claim 1 wherein said processor is configured so that all processing is accomplished on source data provided to said processor in one systolic cycle per source data input.

18. The processor of claim 1 wherein said processor is configured to recognize strings in source data that fulfill a reference pattern specification of a set of fixed and variable component substrings comprising one or more of:
- fixed strings of primary input components;
- strings in which relative locations can have one of a number of different values;
- strings in which a value or set of values can repeat zero or more times; and
- strings in which one or more substrings can have one of a number of alternative values.

* * * * *